(12) United States Patent
Fujikawa et al.

(10) Patent No.: US 7,881,073 B2
(45) Date of Patent: Feb. 1, 2011

(54) ELECTRONIC APPARATUS

(75) Inventors: Hideyuki Fujikawa, Kawasaki (JP); Hirokatsu Kato, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 220 days.

(21) Appl. No.: 12/318,055

(22) Filed: Dec. 19, 2008

(65) Prior Publication Data
US 2009/0262507 A1  Oct. 22, 2009

(30) Foreign Application Priority Data
Apr. 21, 2008  (JP) .............................. 2008-110358

(51) Int. Cl.
*H05K 7/14* (2006.01)

(52) U.S. Cl. ............. 361/807; 361/809; 361/679.39; 361/802; 361/759; 361/756

(58) Field of Classification Search ............ 361/679.21, 361/679.33, 679.37, 679.39, 740, 741, 756, 361/759, 802, 807, 809
See application file for complete search history.

(56) References Cited

U.S. PATENT DOCUMENTS

| | | | |
|---|---|---|---|
| 5,592,362 A | 1/1997 | Ohgami et al. | |
| 5,738,536 A | 4/1998 | Ohgami et al. | |
| 6,191,938 B1 | 2/2001 | Ohgami et al. | |
| 7,002,792 B2 * | 2/2006 | Han et al. | 361/679.21 |
| 7,224,579 B2 * | 5/2007 | Lee | 361/679.21 |
| 7,626,642 B2 * | 12/2009 | Lee | 348/837 |

FOREIGN PATENT DOCUMENTS

| | | |
|---|---|---|
| JP | 7-230343 | 8/1995 |
| JP | 2006-41140 | 2/2006 |

* cited by examiner

*Primary Examiner*—Dameon E Levi
(74) *Attorney, Agent, or Firm*—Staas & Halsey LLP

(57) ABSTRACT

An electronic apparatus includes: a display panel that has a display screen displaying an image on a front surface thereof; a supporting board that has a first surface extending facing a rear surface of the display panel; a first circuit substrate that is fixed to a second surface of the supporting board; and a unit that includes a base board, a plate-like electronic part supported by the base board, and a second circuit substrate fixed to the base board. The unit is supported on the second surface of the supporting board. The first circuit substrate and the second circuit substrate include a first connector and a second connector, respectively. The first connector and the second connector link with each other when the base board is slid in a direction, and go away from each other when the base board is slid in the opposite direction.

7 Claims, 34 Drawing Sheets

ELECTRONIC APPARATUS

This application is based upon and claims the benefit of priority of the prior Japanese Patent Application No. 2008-110358, filed on Apr. 21, 2008, the entire contents of which are incorporated herein by reference.

FIELD

The embodiment discussed herein is related to an electronic apparatus including a display panel which has a display screen, and further including a supporting board which has multiple electronic parts mounted thereon and extends on a rear surface side of the display panel.

BACKGROUND

Taking a personal computer (hereinafter, abbreviated to "PC") as an example, PC has conventionally employed a composition in which: a main body device which stores therein an operational circuit composed of a CPU or the like, and a display device which includes a display screen for displaying an image are set up as separate devices; and the main body device and the display device are connected by a cable. However, with the appearance of a thin-type display panel using a liquid crystal or the like, a so-called laptop PC has appeared in which a display device is openably and closably hinged to a main body device. Moreover, as another type, a so-called integrated PC has appeared in which a conventional display device and a main body device are housed in one housing by arranging an operational circuit including a CPU or the like, at a rear surface side of a display panel.

For example, in the case of the latter type of an electronic apparatus, such as the integrated PC, having a display panel and multiple electronic parts mounted in a rear surface side of the display panel, the problem is how to achieve ease of assembly and ease of disassembly for repair.

Especially, a PC is equipped with a large-area main substrate. Accordingly, due to the large area, it is highly possible that the main substrate interferes with other electronic parts when attached or detached. Therefore, the problem here is how to achieve ease of assembly of the main substrate.

Japanese Laid-open Patent Publication No. 2006-41140 discloses a structure in which a bottom case is slid along a sliding mechanism provided in a housing so that a printed board therein can be taken out.

In the meantime, Japanese Laid-open Patent Publication No. Hei 7-230343 discloses a portable PC in which a sliding mechanism and a stopper are provided in a housing so as to prevent a pack unit from falling out from the housing.

However, none of these Patent Documents includes any point worth paying attention from the viewpoint of improving ease of assembly and disassembly in a type of electronic apparatus, such as an integrated PC, having multiple parts mounted in a rear surface side of a display panel thereof.

SUMMARY

An electronic apparatus includes:

a display panel that has a display screen displaying an image on a front surface thereof;

a supporting board that has a first surface extending facing a rear surface of the display panel;

a first circuit substrate that is fixed to a second surface of the supporting board; and a unit that includes a base board, a plate-like electronic part supported by the base board, and a second circuit substrate fixed to the base board, and that is supported on the second surface of the supporting board, wherein the supporting board includes a first guiding locking part that guides sliding of the base board in directions coming close to and going away from the first circuit substrate, the first guiding locking part locking the base board when the base board is slid in the direction coming close to the first circuit substrate and releasing locking of the base board when the base board is slid in the direction going away from the first circuit substrate, the base board includes a second guiding locking part that is in contact with the supporting board and that is slid in the directions coming close to and going away from the first circuit substrate by being guided by the first guiding locking part, the second guiding locking part being locked by the first guiding locking part when the base board is slid in the direction coming close to the first circuit substrate, and being released from locking to the first guiding locking part when the base board is slid in the direction going away from the first circuit substrate, and the first circuit substrate and the second circuit substrate include a first connector and a second connector, respectively, the first connector and the second connector linking with each other when the base board is slid so that the second guiding locking part is guided to be locked by the first guiding locking part, and going away from each other when the base board is slid so that the second guiding locking part is released from locking to the first guiding locking part.

Objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT

Hereinafter, an embodiment of the present invention disclosed herein will be described.

[Overall Composition]

Figure 1:
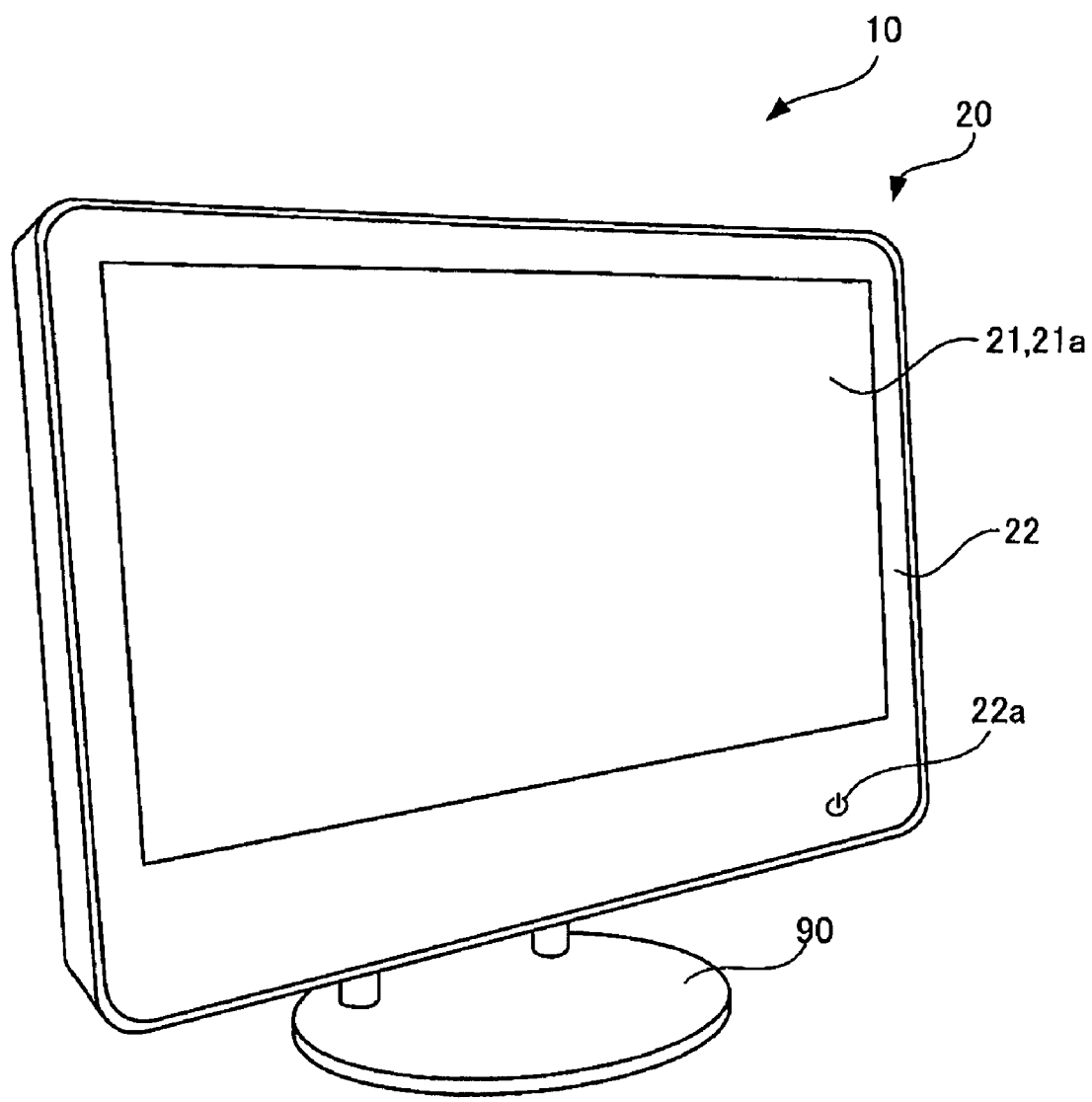
FIG. 1 is an external perspective view of a personal computer (PC)
Figure 2:
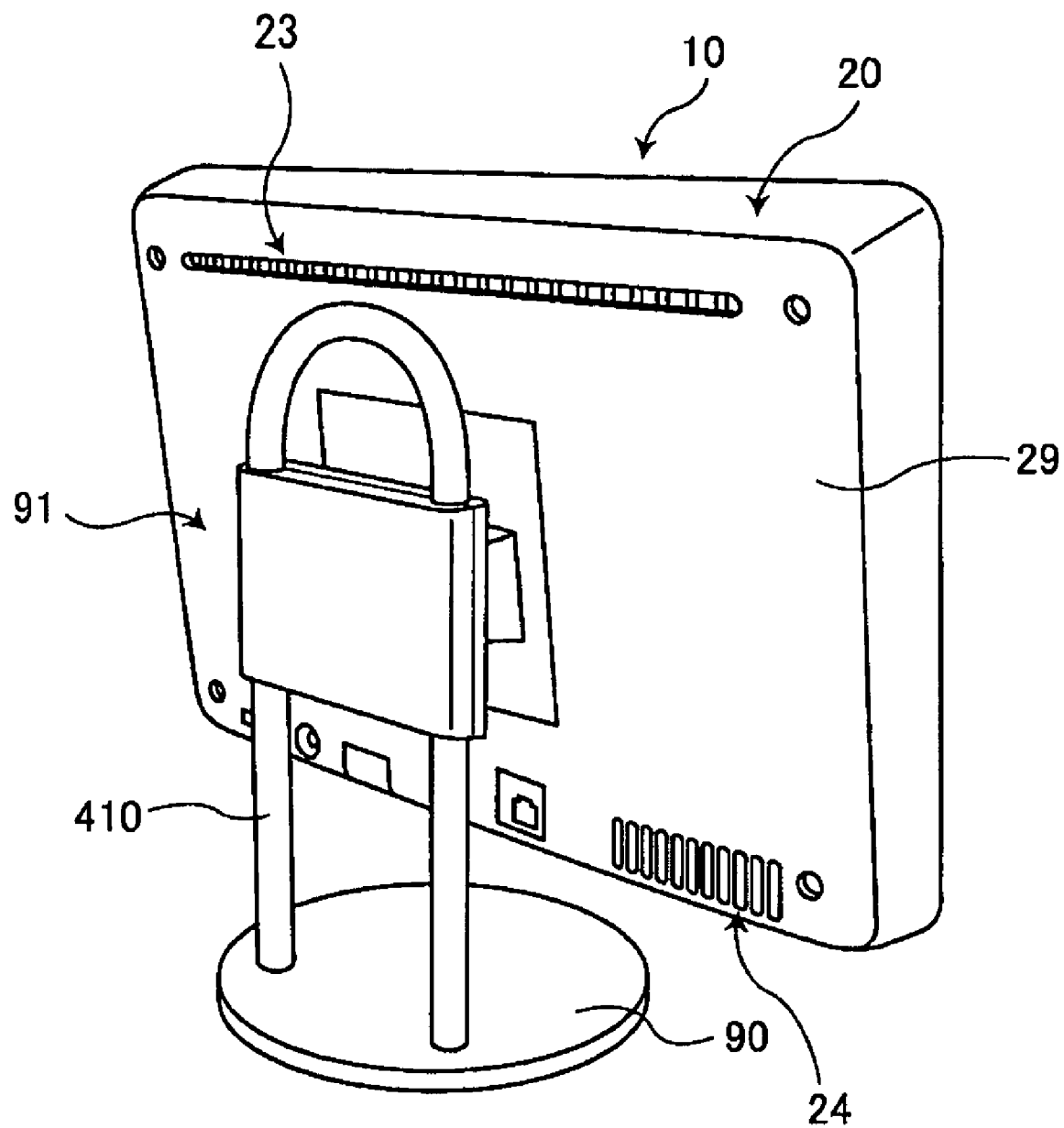
FIG. 2 is an external perspective view looking at a rear surface side of the PC illustrated in FIG. 1.

FIG. 1 is an external perspective view of a personal computer (hereinafter, abbreviated to "PC"), and FIG. 2 is an external perspective view looking at a rear surface side of the PC illustrated in FIG. 1.

A PC 10 illustrated in FIGS. 1 and 2 includes a PC main unit 20 holding a display panel 21 having a display screen 21a. The external shape of the front surface of the PC main unit 20 is formed by the display screen 21a and a front frame 22 surrounding the display screen 21a. On a bottom part of the front frame 22, an icon 22a by silk-screen printing is displayed. The icon 22a represents a power button, and, when a finger is placed on this icon 22a, power is applied to the PC main unit 20.

The PC 10 illustrated in FIGS. 1 and 2 is provided with an operational circuit composed of a CPU or the like mounted on a rear surface side of the display panel 21 in the same housing of the PC main unit 20 holding the display panel 21 having the display screen 21a.

Accordingly, as a regular composition of a PC, by separately preparing a keyboard, a standard function of a PC can be satisfied. Since the embodiment of the present disclosure is not related to a keyboard, illustration and description of a keyboard will be omitted herein.

In the meantime, a rear surface of the housing of the PC main unit 20 is covered by a rear cover 29 which is provided with an air inlet opening 23 and an air discharge opening 24 formed thereon. The air inlet opening 23 is for intake of external air into the housing of the PC main unit 20, and the air discharge opening 24 is for discharge of air heated in the housing.

Further, on the rear surface of the housing of the PC main unit 20, a power source connection part, a connector connection part, and the like are arranged. However, descriptions thereof will be omitted herein.

Furthermore, the PC 10 illustrated in FIGS. 1 and 2 includes a rotating table 90 and a supporting mechanism 91 which supports the rear surface of the PC main unit 20. The rotating table 90 is a table for changing a direction of the display screen 21a of the PC main unit 20, and the supporting mechanism 91 is a mechanism for supporting the PC main unit 20 at a height position desired by a user.

[Air Inlet Opening Structure]

Figure 3:
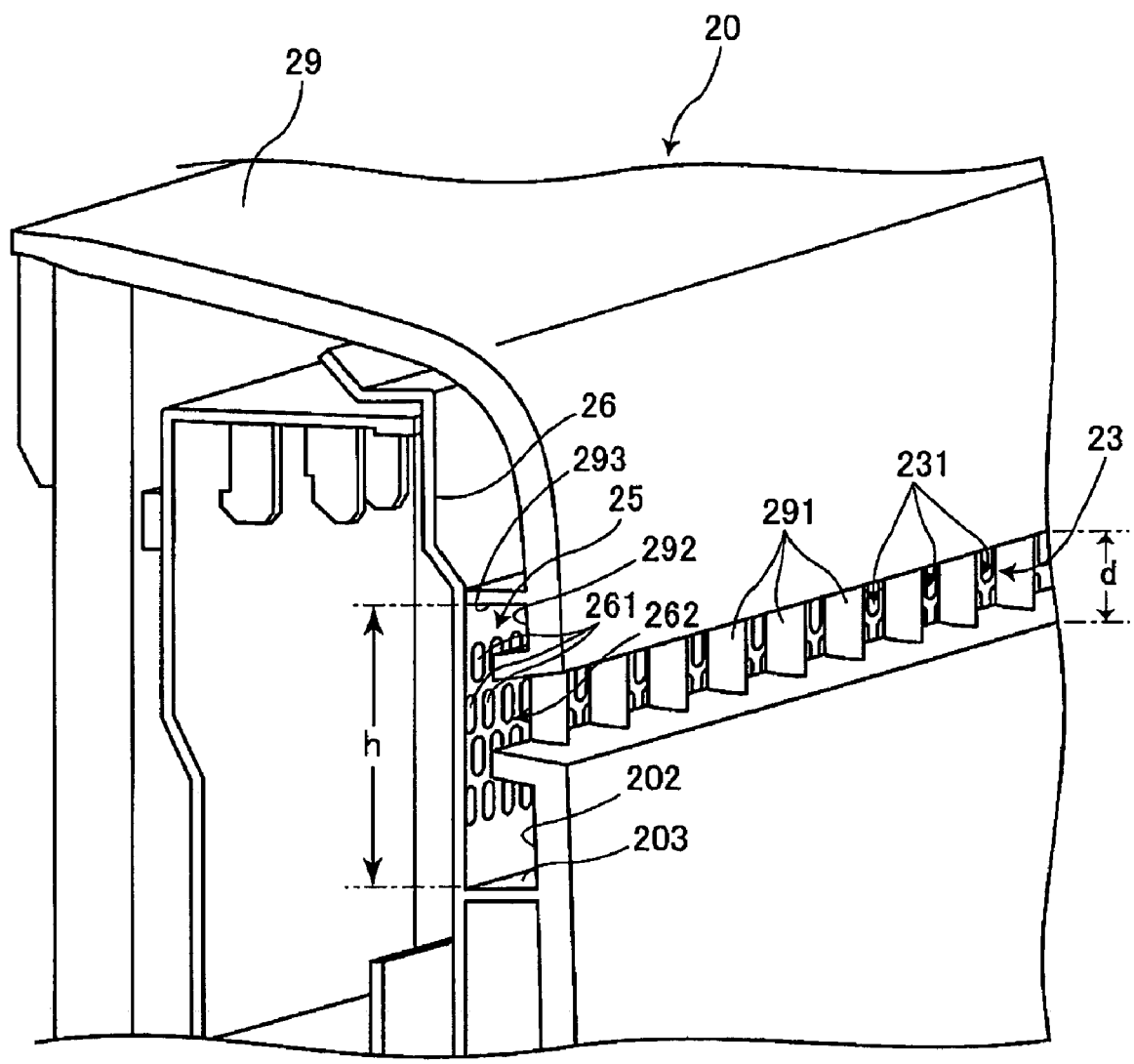
FIG. 3 is a cross-sectional perspective view illustrating a part of an air inlet opening on the rear surface of the PC main unit.

FIG. 3 is a cross-sectional perspective view illustrating a part of the air inlet opening on the rear surface of the PC main unit.

The air inlet opening 23 has multiple posts 291 which are formed by a part of the rear cover 29 and aligned laterally, and the air inlet opening 23 is formed by multiple holes 231. The each of the multiple holes 231 is formed between adjacent ones of the posts 291, and the multiple holes 231 are aligned side by side with each other.

Inside of the air inlet opening 23, an air inlet compartment 25 is formed. The air inlet compartment 25 is defined by an inner wall surface 292 of the rear cover 29, walls 293 formed upright from the inner wall surface 292, and a shielding board 26. The vertical dimension "h" of the air inlet compartment 25 is several times larger than the vertical dimension "d" of the air inlet opening 23, and the horizontal dimension of the air inlet compartment 25 is approximately the same as that of the air inlet opening 23, illustrated in FIG. 2, which is long in sideways. As described above, the air inlet compartment 25 is formed so that the dimension of a cross section crossing an inlet inflow direction from the air inlet opening 23 can be larger than that of the air inlet opening 23.

Meanwhile, the shielding board 26 takes a role of electrically shielding inside electronic parts by covering them. Furthermore, the shielding board 26 is provided with multiple holes 261 formed thereon. The multiple holes 261 are arranged to be dispersed in a region larger than the dimension of the air inlet opening 23 on a surface, which forms the air inlet compartment 25, of the shielding board 26. That is, the multiple holes 261 are formed, among surfaces forming the air inlet compartment 25, on a surface of the housing, which surface is opposite to the inner wall surface 292 provided with the air inlet opening 23 is formed. These multiple holes 261 are part of an air suction section 262 for taking the air in the air inlet compartment 25 further into the back of the housing is formed.

As described above, in the PC of this embodiment, air sucked in through the air inlet opening 23 is once decelerated in the air inlet compartment 25, leaves dust in the air inlet compartment 25 by the deceleration, passes through the air suction section 262, and is taken further into the back of the housing. In other words, in this embodiment, with such a simple structure as described above, a PC having high dust removal capability can be provided.

Figure 4:
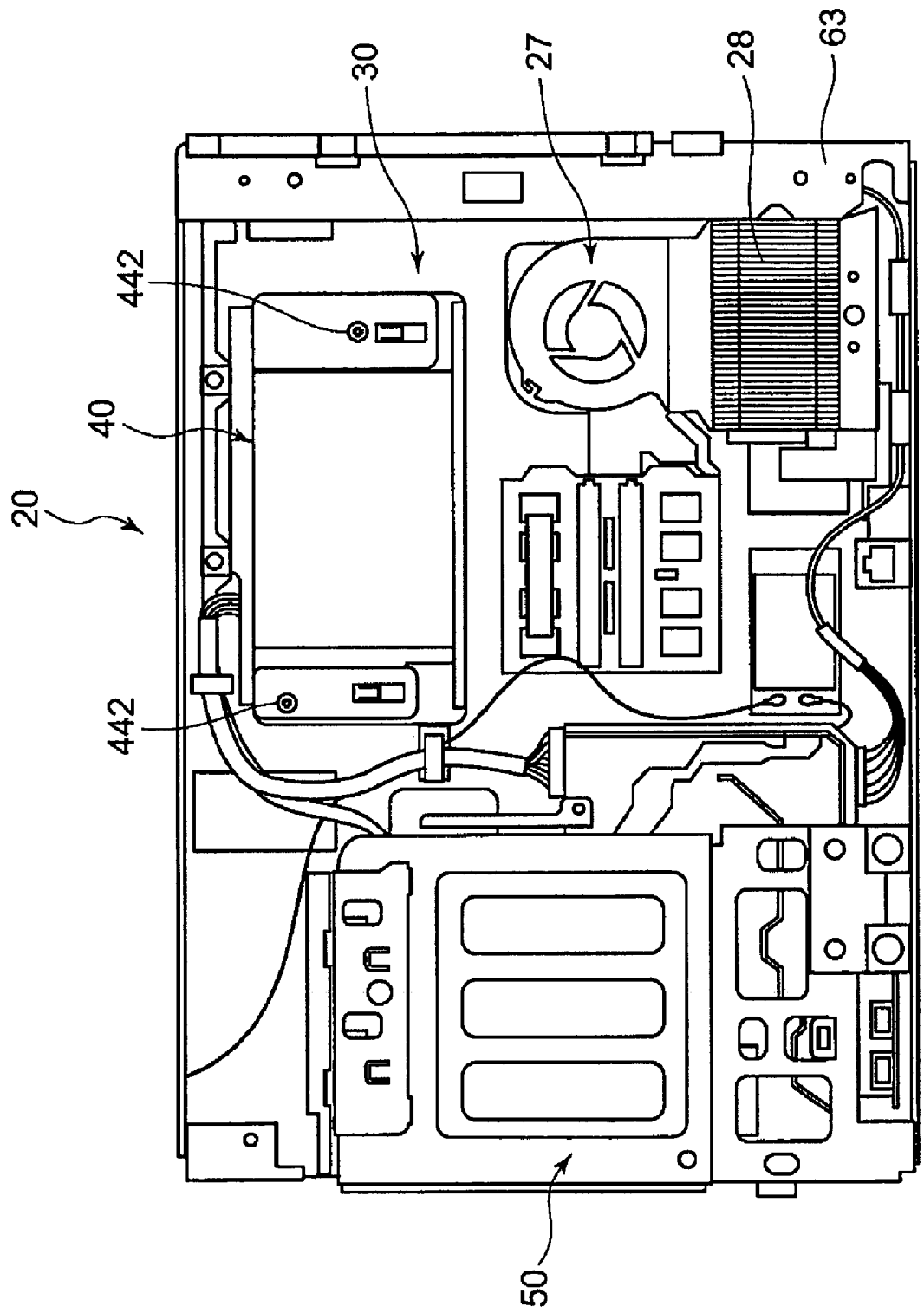
FIG. 4 is a view illustrating a composition of the inside of the PC main unit illustrated in FIGS. 1 and 2 with a rear surface cover having been detached.

FIG. 4 is a view illustrating a composition of the inside of the PC main unit 20 illustrated in FIGS. 1 and 2 with the rear surface cover having been detached.

Here, a fan 27 and a radiating fin 28 are illustrated. The fan 27 is for forcing discharge of air in the housing. When the fan 27 is rotating, air is sucked in through the air inlet opening 23 illustrated in FIGS. 2 and 3, and the air goes through the inside of the housing and reaches the fan 27. The air blew out from the fan 27 passes through the gap of the radiating fin 28, and is discharged from the air discharge opening 24 (refer to FIG. 2). The air going through the inside of the housing is heated even before reaching the fan 27, since it draws heat away from various electronic parts inside of the housing. The radiating fin 28 is in contact with the CPU which is a heat-generating electronic part not illustrated in the drawing, and the air sent by the fan 27 is discharged from the air discharge opening 24 after drawing heat away from the radiating fin 28 heated by the CPU.

Meanwhile, in FIG. 4, a main substrate 30 which is provided with the CPU mounted thereon and takes up a large region in the right-hand side of FIG. 4, a hard disk drive (HDD) unit 40 placed on the main substrate 30, and an optical disk unit 50 connected to the main substrate 30 through a connector (which will be described below) are illustrated. Details of the HDD unit 40 and the optical disk unit 50 will be described below.

Furthermore, here, a mounting bracket 63 which vertically extends on the right-hand side of FIG. 4 is arranged. The mounting bracket 63 will also be described below.

[HDD Mounting Structure]

Figure 5:
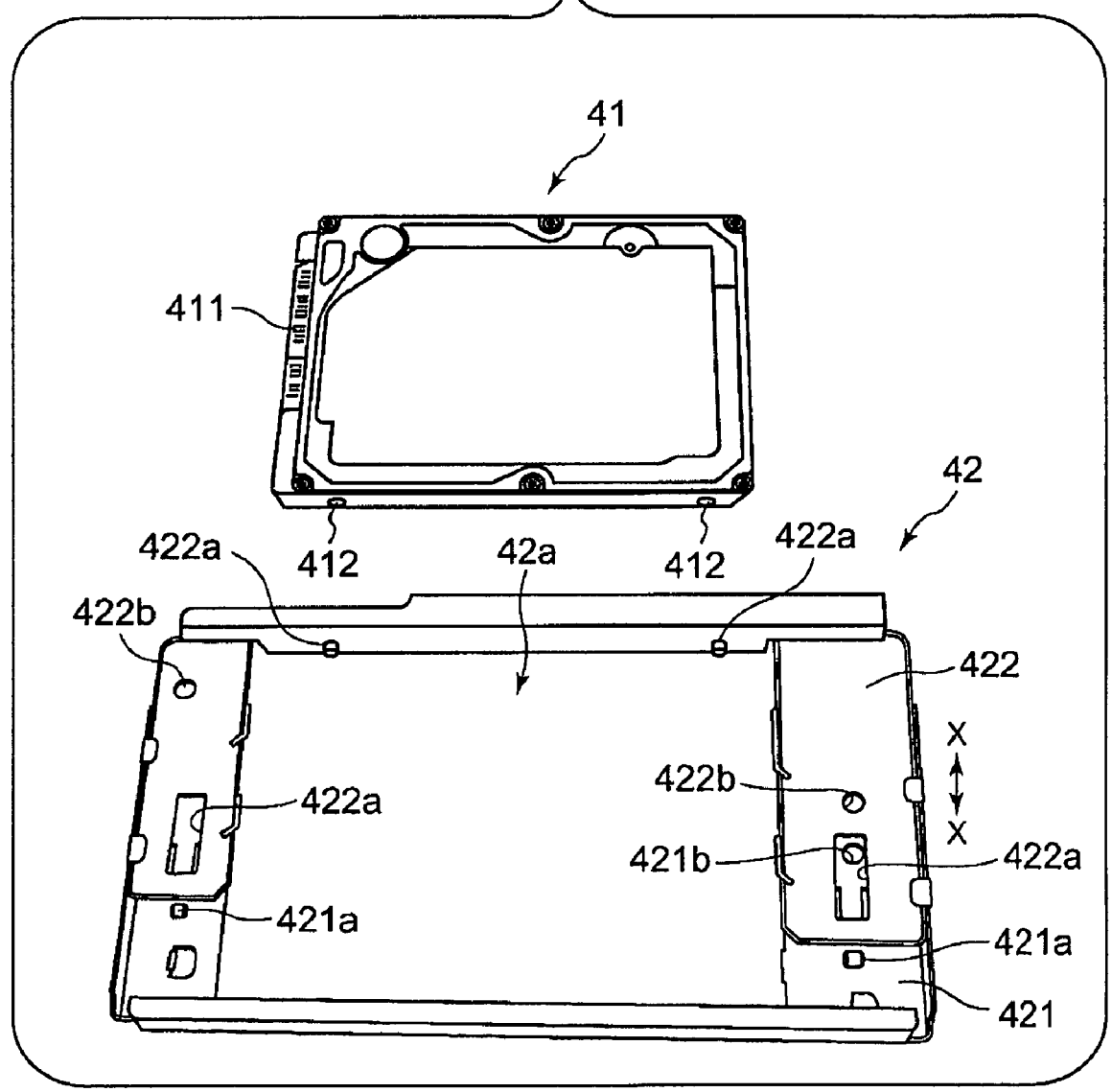
FIG. 5 is a perspective view illustrating a hard disk drive (HDD) alone and a holder storing the HDD.

FIG. 5 is a perspective view illustrating a hard disk drive (HDD) alone and a holder storing the HDD.

An HDD 41 has a substantially rectangular plate-like shape in a planar view, and is provided with an HDD connector 411 on a front edge surface thereof. The HDD connector 411 is a connector to be connected with a counterpart connector when the HDD 41 is caused to proceed with the front edge surface, on which the HDD connector 411 is arranged, at the head. Furthermore, the HDD 41 is provided with two engaging holes 412 formed on both side surfaces thereof respectively. In FIG. 5, among the engaging holes 412 on the both respective side surfaces, the engaging holes 412 on a side surface located in the front are illustrated.

Meanwhile, a holder 42 is composed by two holder members 421 and 422. These two holder members 412 and 422 cooperate with each other so as to form an opening 42a on which the HDD 41 is to be arranged. One of the two holder members 421 and 422 is slidable in a lateral direction (direction of an arrow X-X) relative to the other one, and the sliding causes the horizontal width of the opening 42a to expand or contract. Furthermore, by causing the horizontal width of the opening 42a to contract in a state where the HDD 41 is being arranged in the opening 42a, both side surfaces of the HDD 41 are sandwiched and held by the holder 42.

Here, on each of the side surfaces, which block out the opening 42a, of the two holder members 421 and 422 constituting the holder 42, two pins are provided. In FIG. 5, two pins 422a provided on the side surface of the holder member 422 are illustrated.

Figure 6:
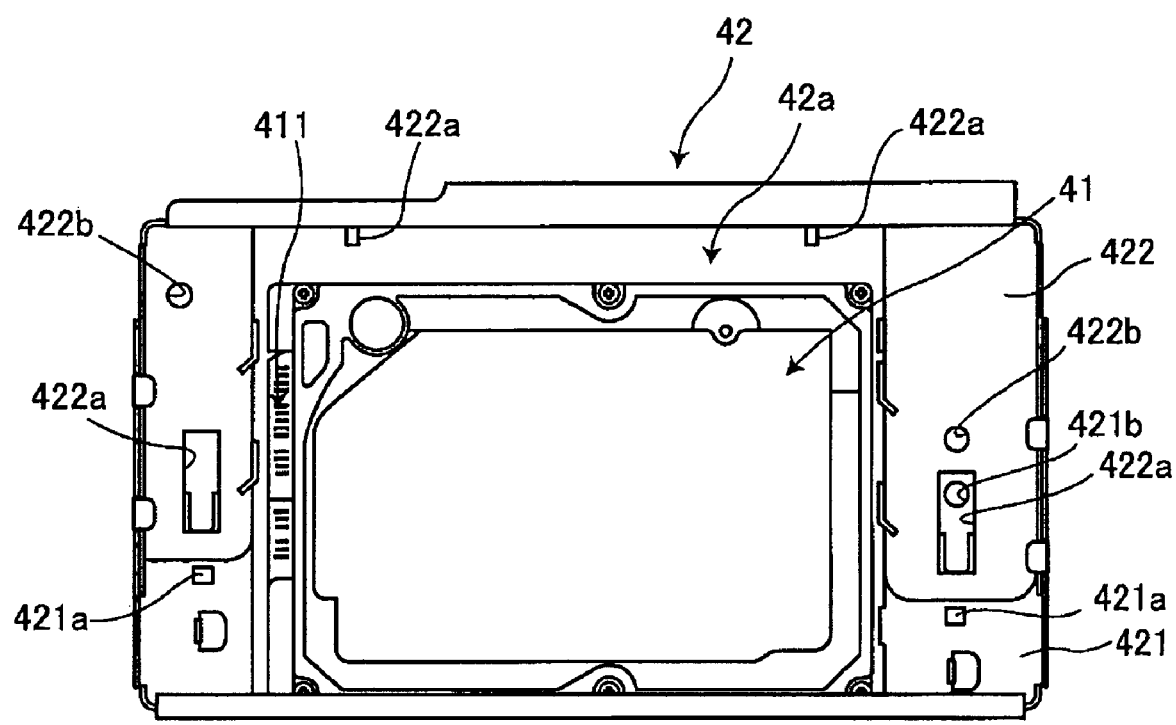
FIG. 6 is a view illustrating a state in which the HDD is arranged at an opening of the holder.

FIG. 6 is a view illustrating a state in which the HDD is arranged at the opening of the holder.

In the state illustrated in FIG. 6, the opening 42a of the holder 42 is in a state of having its horizontal width being open.

As illustrated in FIG. 6, when the HDD 41 is arranged at the opening 42a of the holder 42, and then the horizontal width of the opening 42a is narrowed, the pins (pin 422a and the like) on the both side surfaces of the holder 42 go into the respective engaging holes 412 (refer to FIG. 5) of the both side surfaces of the HDD 41. Accordingly, while the HDD 41 is positioned relative to the holder 42, the HDD 41 is certainly held by the holder 42.

On one holder member 421 of the two holder members 421 and 422, two projections 421a for clicking are formed. On the other holder member 422, two holes 423a into which the two projections 421a come respectively are formed.

Figure 7:
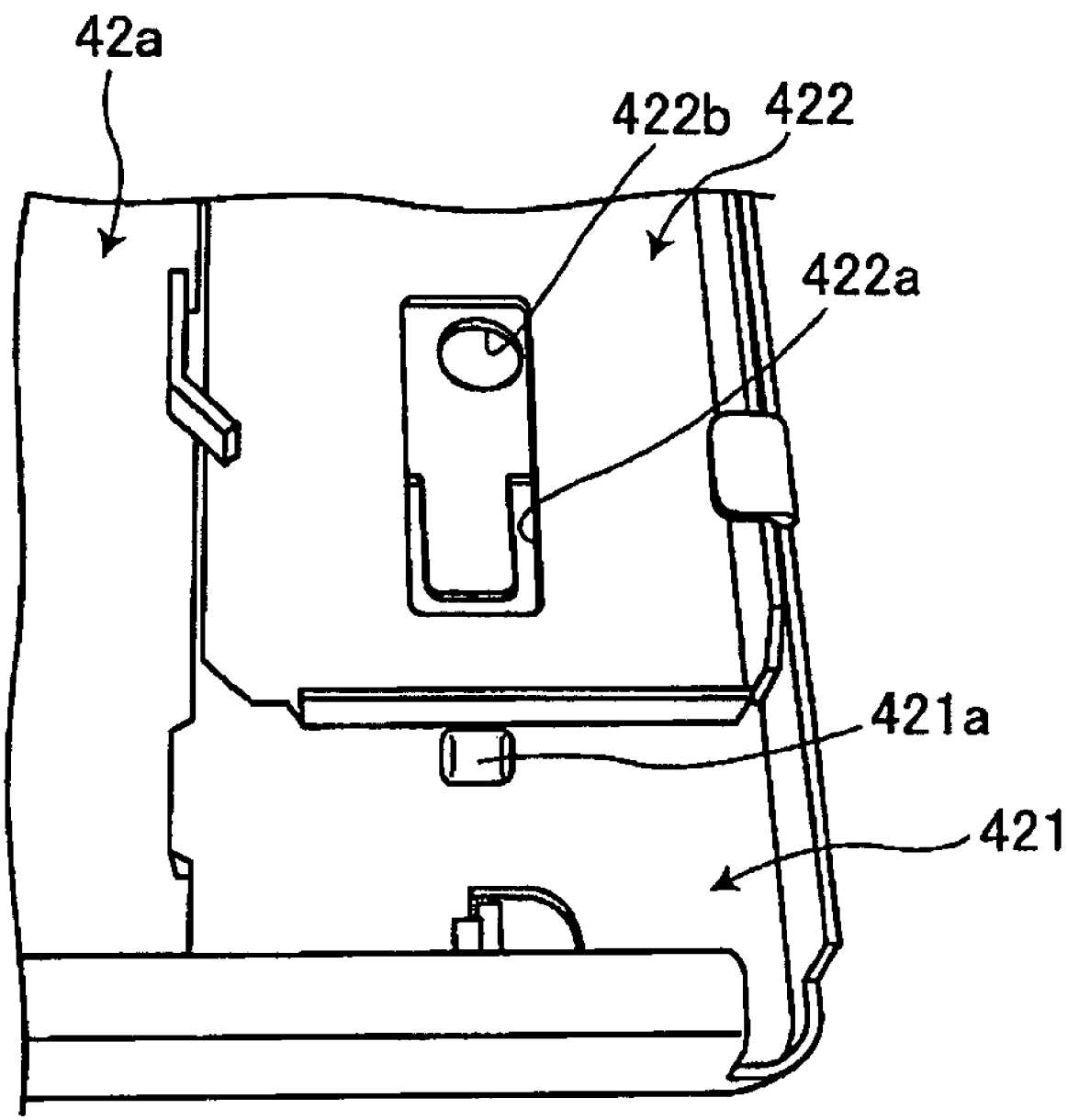
FIG. 7 is a view illustrating a part of one of the combinations of two projections and two holes of the holder.
Figure 8:
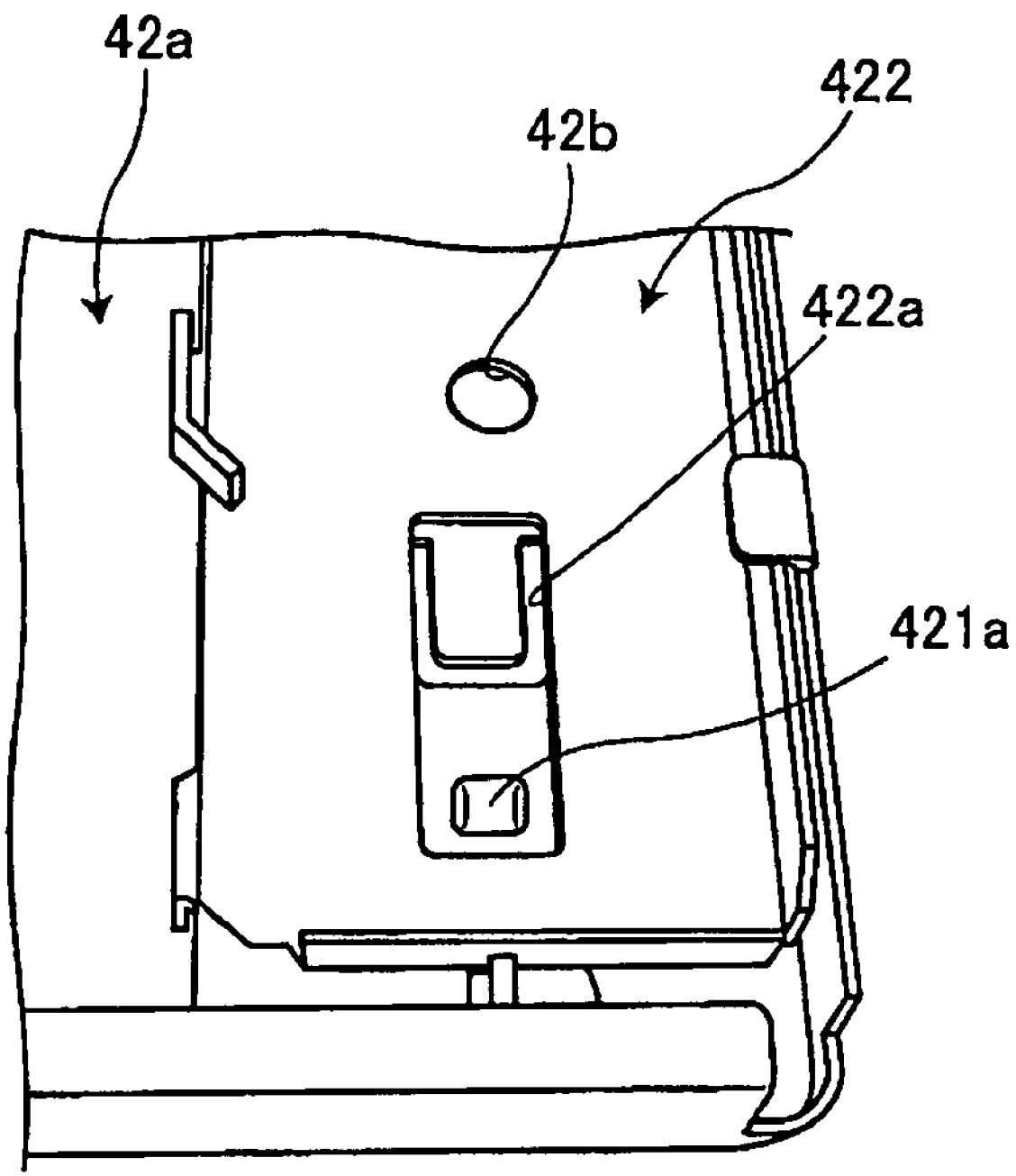
FIG. 8 is a view illustrating a part of one of the combinations of two projections and two holes of the holder.

FIGS. 7 and 8 are views illustrating a part of one of combinations of the two projections 421a and the two holes 423a of the holder 42. FIG. 7 illustrates a positional relationship between the projection 421a and the hole 423a in a state where the horizontal width of the opening 42a is expanded, while FIG. 8 illustrates a positional relationship between the projection 421a and the hole 423a in a state where the horizontal width of the opening 42a is narrowed.

In the state where the horizontal width of the opening 42a is expanded, as illustrated in FIG. 7, the projection 421a is located outside of the holder member 422. When one of the two holder members 421 and 422 is slid relative to the other one in order to narrow the horizontal width of the opening 42a, the projection 421 goes into the hole 423a as illustrated in FIG. 8. As described above, when the holder members 421 and 422 are slid so as to expand or narrow the horizontal width of the opening 42a, the slide occurs with a click due to the interference between the projection 421a and the holder member 422. Accordingly, it is configured such that slide between the state of being expanded and that of being narrowed may not occur unless a certain level of force is applied.

Meanwhile, the holder member 421 is provided with two screw mounting holes 421b while the holder member 422 is provided with two screw mounting holes 422b. It is configured such that each pair of the mounting holes 421b and 422b may overlap with each other to constitute a mounting hole 42b of the holder 42 when the horizontal width of the opening 42a is narrowed, and that the holder 42 is to be screwed by a fixing bracket which will be described below.

Figure 9:
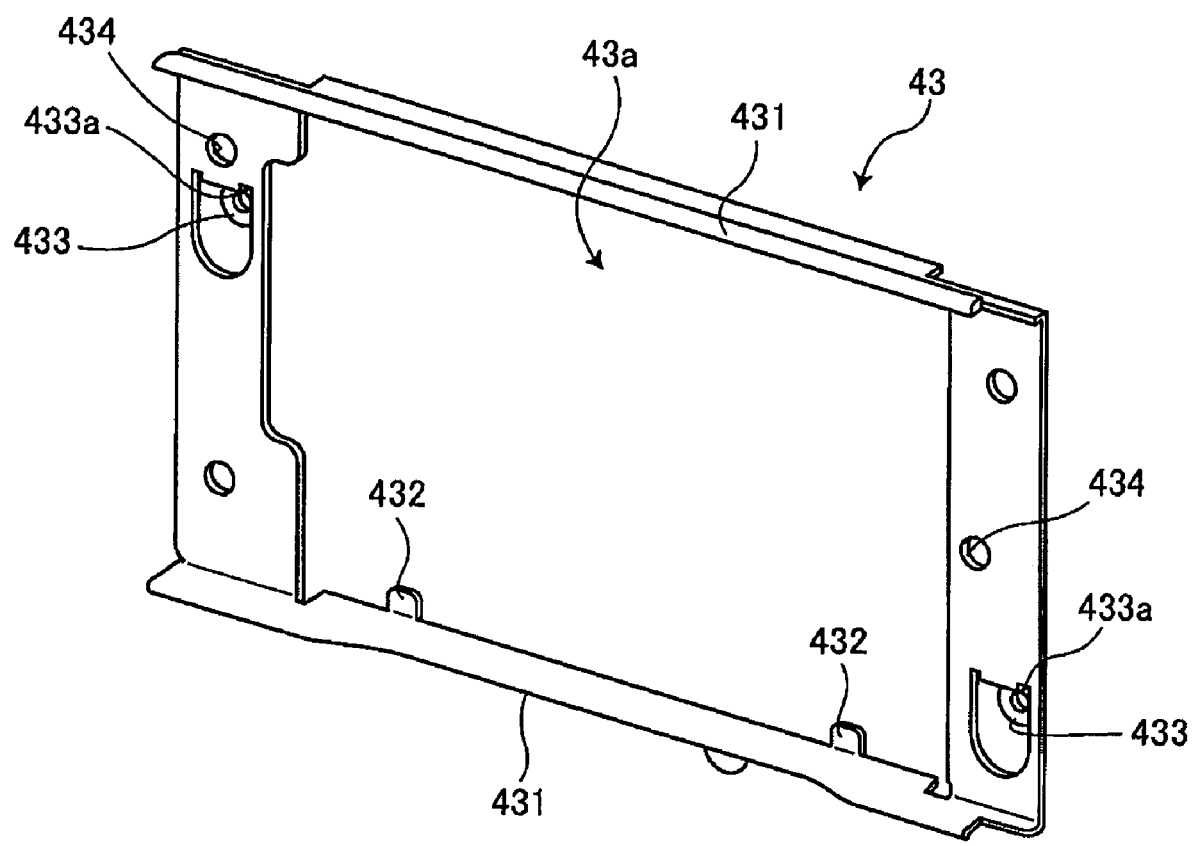
FIG. 9 is a perspective view of a fixing bracket.

FIG. 9 is a perspective view of the fixing bracket.

A fixing bracket 43 is for attaching the holder 42 holding the HDD 41, and is to be fixed on the main substrate 30 (refer to FIG. 4).

The fixing bracket 43 has, at a center thereof, an opening 43a in which the HDD 41 held by the holder 42 is to be arranged, and guiding rails 431 for guiding the holder 42 are formed at both sides of the opening 43a.

Further, the fixing bracket 43 is provided with rack parts 432, which are formed by being bent so as to enter from the guiding rail 431 into the opening 43a, for mounting the fixing bracket 43 onto the main substrate. Furthermore, the fixing bracket 43 is provided with a fixing tongue piece 433 at two sites. These fixing tongue pieces 433 each bend towards the main substrate side, have a shape with its tip part bending in the opposite direction, and have a screw fixing hole 433*a* at the tip part in contact with the main substrate. Furthermore, on the fixing bracket 43, a screw hole 434 for screwing the holder 42 is formed.

Figure 10:
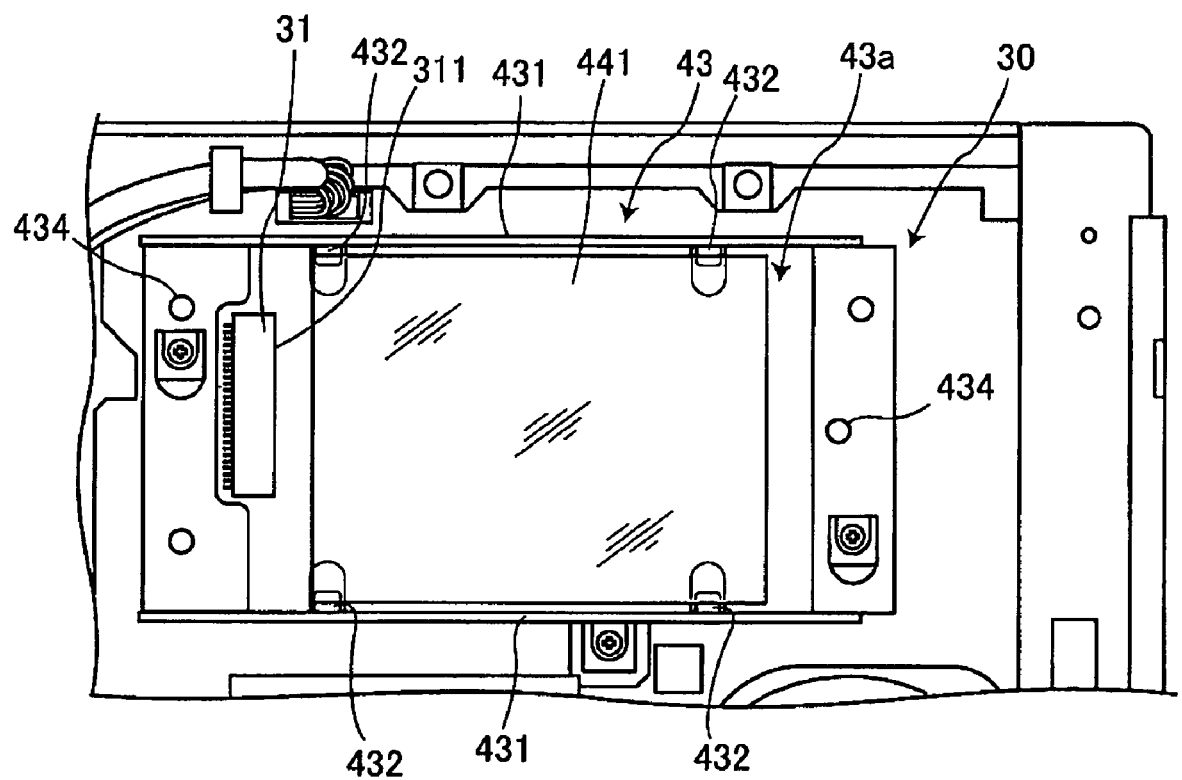
FIG. 10 is a view illustrating a state in which the fixing bracket is fixed onto a main substrate.

FIG. 10 is a view illustrating a state in which the fixing bracket illustrated in FIG. 9 is fixed onto the main substrate.

On the main substrate 30, a large number of electronic parts, such as CPU, are mounted. As a part needed for a description herein among them, on the main substrate 30, a substrate connector 31 to be linked with the HDD connector 411 (refer to FIG. 5) is mounted. The substrate connector 31 is located at a front edge of the opening 43*a* formed by the fixing bracket 43, and is in a state where, with a joint surface 311 to be linked with the HDD connector 411 being sideways, the joint surface 311 is facing a rear edge side of the opening 43*a*.

Furthermore, in the opening 43*a* of the fixing bracket 43, an insulating sheet 441 is arranged, and fixed onto the main substrate 30 by a double-faced adhesive tape (not illustrated in the drawing).

At the opening 43*a*, the HDD 41 is placed at a height such that the HDD 41 may not just barely come in contact with the main substrate 30. However, a printed wiring (not illustrated in the drawing) exists on the main substrate 30. Accordingly, by attaching the insulating sheet 441 herein, the contact between the printed wiring and the housing of the HDD 41 is surely prevented.

Figure 11:
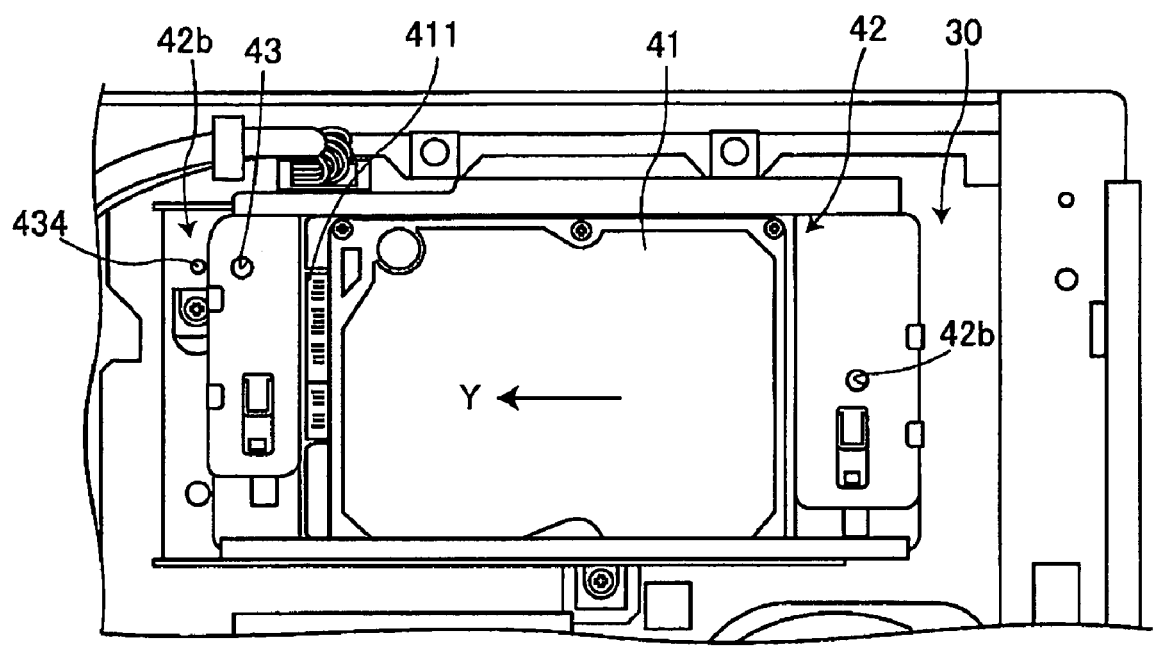
FIG. 11 is a view illustrating a state in which the holder holding the HDD is placed on the fixing bracket.

FIG. 11 is a view illustrating a state in which the holder holding the HDD is placed on the fixing bracket.

The holder 42 is placed on the fixing bracket 43 while holding the HDD 41. FIG. 11 illustrates a state immediately after the placement. After placed on the fixing bracket 43, the holder 42 is slid forward (direction of an arrow Y) while being guided by the guiding rails 431 (refer to FIG. 10). By this sliding, the HDD connector 411 is linked to the substrate connector 31 (refer to FIG. 10) fixed on the main substrate 30.

Here, the holder 42 is slid by being guided by the guiding rails 431. Accordingly, the HDD connector 411 and the substrate connector 31 face with each other in a state of being designated at respective positions, and are caused to surely link with each other.

Meanwhile, the fixing bracket 43 is provided with the opening 43*a*, the holder 42 is also provided with the opening 42*a*, and the HDD 41 is arranged at a height such that the HDD 41 may not just barely come in contact with the main substrate 30. Accordingly, they contribute to making the PC main unit 20 thinner and smaller.

When the holder 42 is slid forward (direction of the arrow Y) from being in the state in FIG. 11, the mounting hole 42*b* of the holder 42 comes to overlap with the screw hole 434 of the fixing bracket 43. In this state, the holder 42 is screwed, as illustrated in FIG. 4, to the fixing bracket 43 by a screw 442.

[Supporting Board Attaching Structure]

Figure 12:
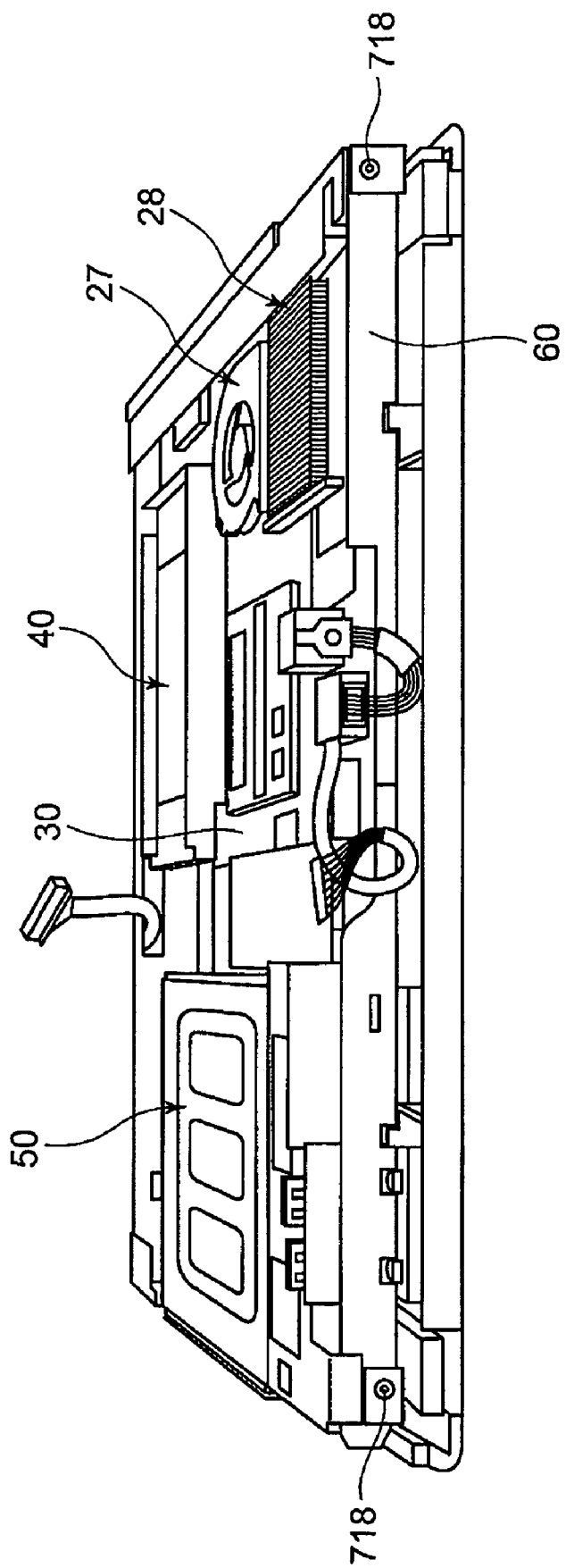
FIG. 12 is a perspective view of a plane surface of the PC main unit seen from obliquely below with the rear surface cover having been detached.
Figure 13:
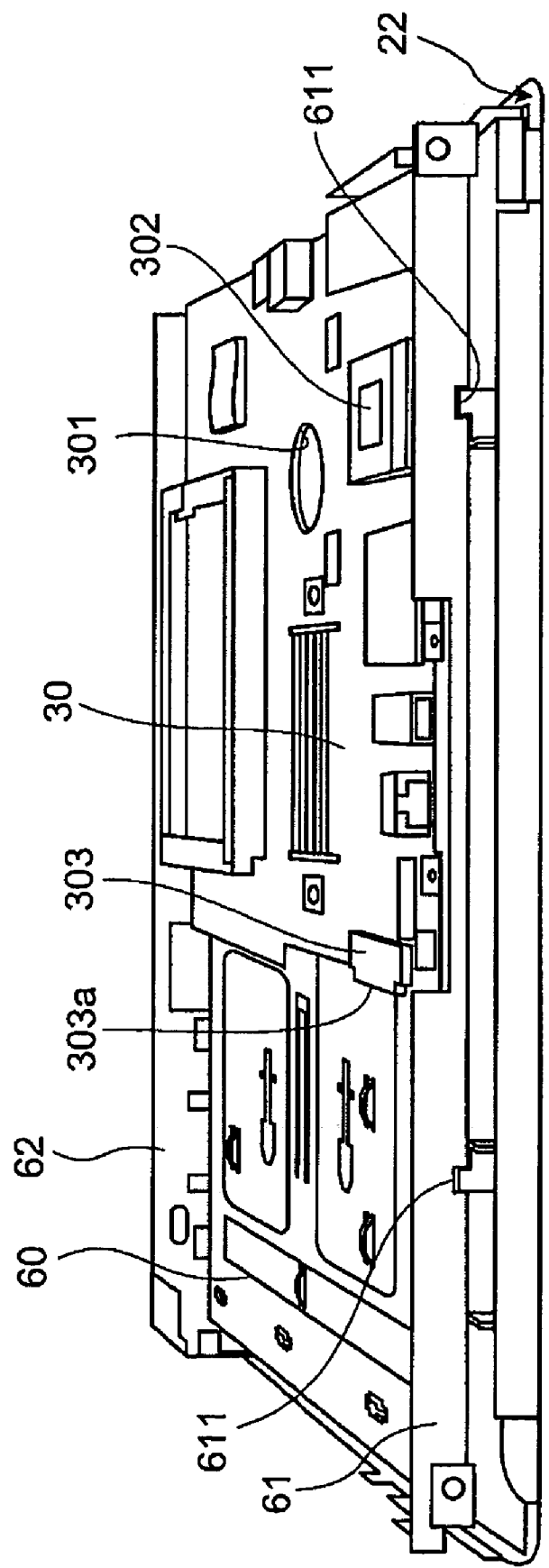
FIG. 13 is a perspective view, similar to FIG. 12, illustrating the state illustrated in FIG. 12 when some parts have been detached therefrom.
Figure 14:
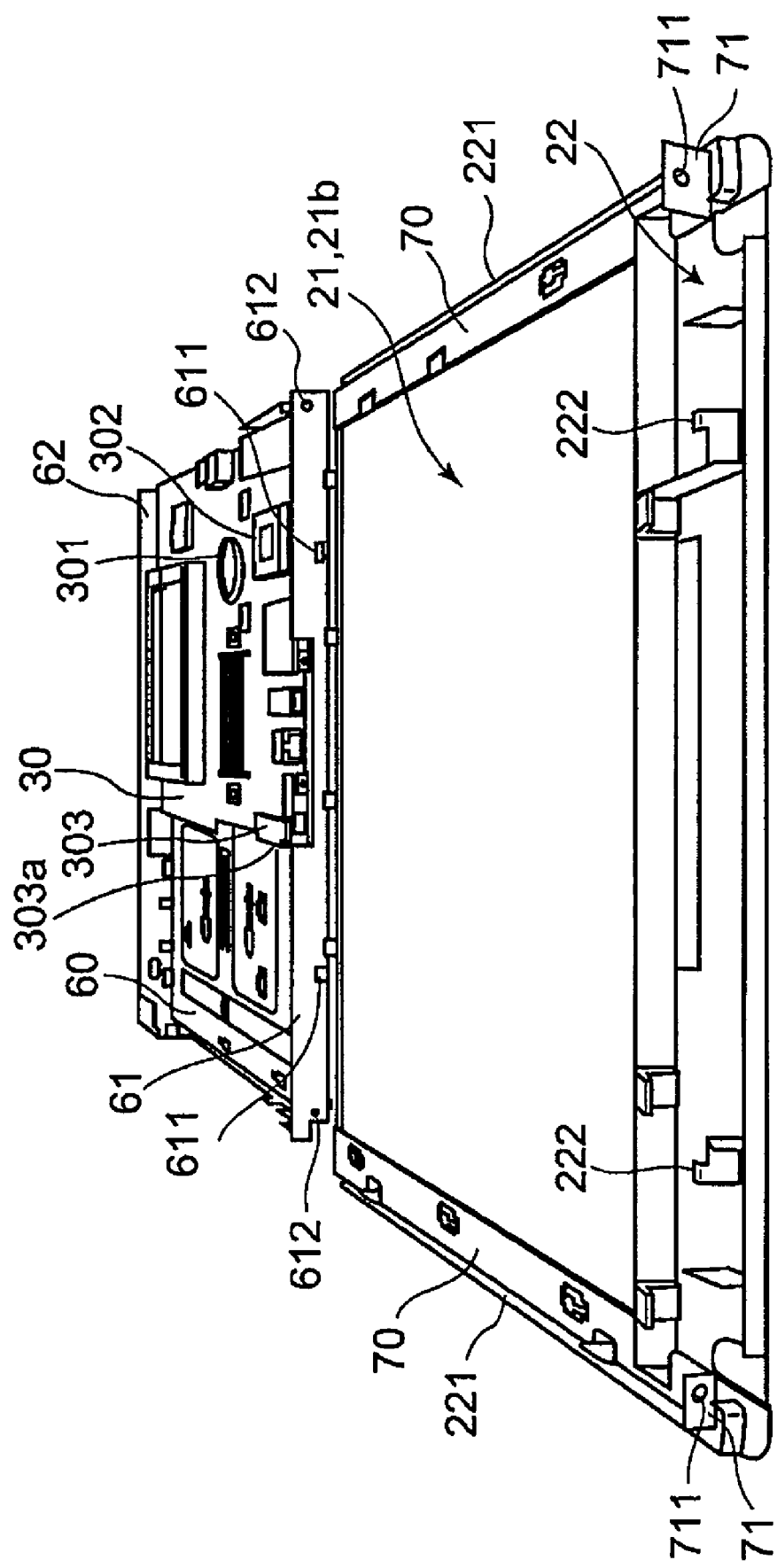
FIG. 14 is a perspective view illustrating a supporting board and a display panel (rear surface) side-by-side when the supporting board has been detached from the rear surface of the display panel.

FIG. 12 is a perspective view of a rear surface of the PC main unit seen from obliquely below with the rear surface cover having been detached, FIG. 13 is a perspective view, similar to FIG. 12, illustrating the state where some parts have been detached from the state illustrated in FIG. 12, and FIG. 14 is a perspective view illustrating a supporting board and a display panel (rear surface) side-by-side when the supporting board is detached from the rear surface of the display panel.

In FIG. 12, similarly to FIG. 4, the fan 27, the radiating fin 28, the main substrate 30, the HDD unit 40, the optical disk unit 50, and the like are illustrated. They are arranged on a supporting board 60 made of metal which extends facing a rear surface 21*b* of the display panel 21 (in FIG. 14, the rear surface 21*b* of the display panel 21 is illustrated) having the display screen 21*a* illustrated in FIG. 1.

In FIGS. 13 and 14, the optical disk unit 50 is detached, and it is seen that the supporting board 60 extends. Holes and projections illustrated in a part from which the optical disk unit 50 is detached are responsible for guiding when the optical disk unit 50 is attached or detached, locking to the supporting board 60, and the like, and will be described in detail below.

Meanwhile, on the supporting board 60, in a part other than the part from which the optical disk unit 50 is detached, the main substrate 30 extends. In FIGS. 13 and 14, the fan 27 and the radiating fin 28 have also been detached, a hole 301, which is formed on the main substrate 30, for aspirating air to the fan 27 is illustrated, and a CPU 302 from which heat is released by the radiating fin 28 is illustrated. In the meantime, onto the main substrate 30, on the optical disk unit side, a connector 303 having a joint surface 303*a* thereof, which is to be linked with a counterpart connector, face the optical disk unit side is fixed.

Meanwhile, the supporting board 60 has, in addition to the part extending at the rear surface of the display panel 21, at a bottom edge side (at the front side in FIGS. 12 and 13), a supporting board lower surface 61 formed by bending the supporting board 60 towards the rear surface side of the PC main unit, and, at an upper edge side (at the back side in FIGS. 12 and 13), a supporting board upper surface 62 formed by bending the supporting board 60 towards the rear surface side of the PC main unit.

Furthermore, on both side surfaces of the display panel 21, screw holes (not illustrated in the drawing) are formed. A matched pair of fixing brackets 70 is fixed onto the both respective side surfaces of the display panel 21 by screws, and the display panel 21 in a state of having, on its left and right side, the pair of fixing brackets 70 being screwed is fitted into the front frame 22.

Meanwhile, on the supporting board lower surface 61, front frame engaging holes 611 are formed, and, on the front frame 22, locking projections 222 which project towards the supporting board lower surface 61 and are respectively to go into the front frame engaging holes 611 formed on the supporting board lower surface 61 are formed.

The pair of fixing brackets 70 fixed on both respective sides of the display panel 21 extends vertically along respective frame bodies 221 on the both sides, which constitute the front frame 22, and the supporting board 60 is slid downwardly (to the front side in FIGS. 12 to 14) by being carried on the pair of fixing brackets 70. Here, each of the pair of fixing brackets 70 has, at a bottom edge thereof, a fastening part 71 being formed upright by bending the fixing bracket 70 towards the rear surface side of the PC main unit and having a screw mounting hole 711, and a mounting hole 612 is also formed on the supporting board lower surface 61. When the supporting board 60 is slid by being carried on the pair of fixing brackets 70, the mounting hole 711 formed in the fastening part 71 of the fixing bracket 70 and the mounting hole 612 formed in the supporting board lower surface 61 overlap with each other. Accordingly, the supporting board 60 is fixed onto the fixing bracket 70 by use of the mounting holes 711 and 612.

Note that, here, the fastening part 71 is provided in both of the pair of fixing brackets 70, and the supporting board 60 is fixed by two screws 718 (refer to FIG. 12); however, since the fixing bracket 70 and the supporting board 60 are locked by a locking mechanism, which will be described below, screwing may also be performed at any one of the both sides.

Figure 15:
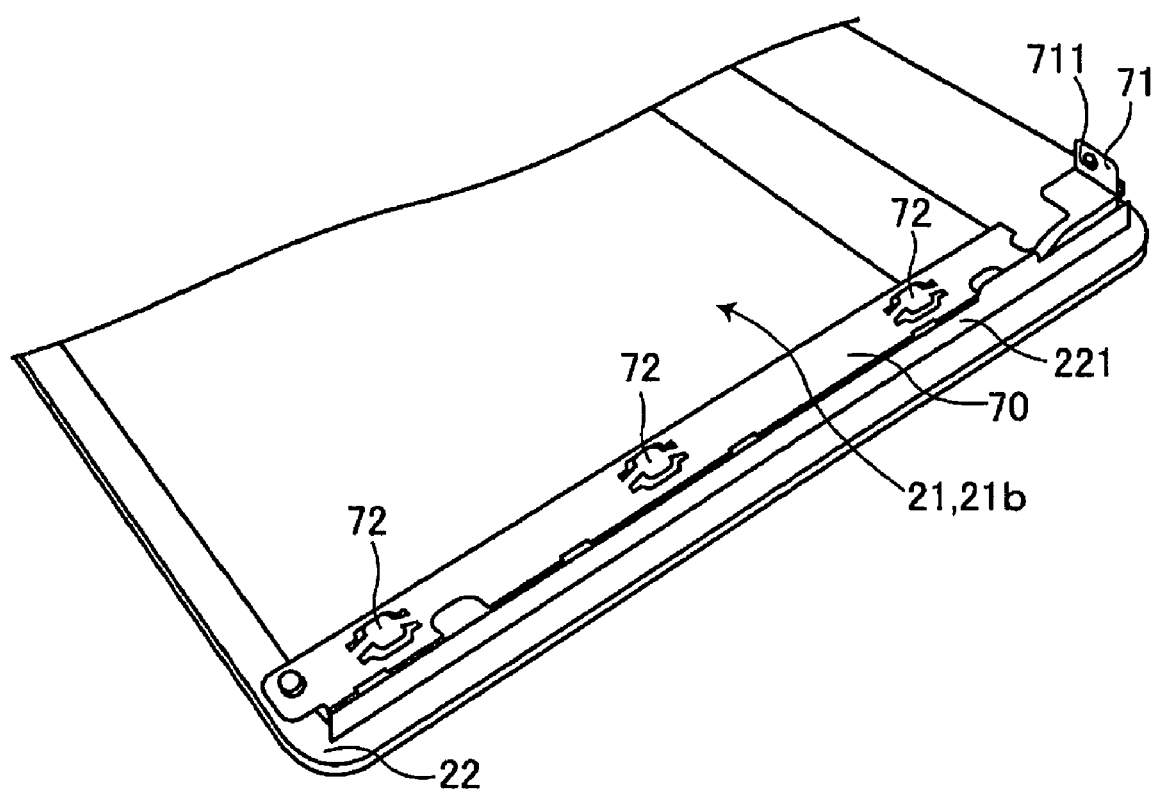
FIG. 15 is a perspective view illustrating a part of one of fixing brackets.
Figure 16:
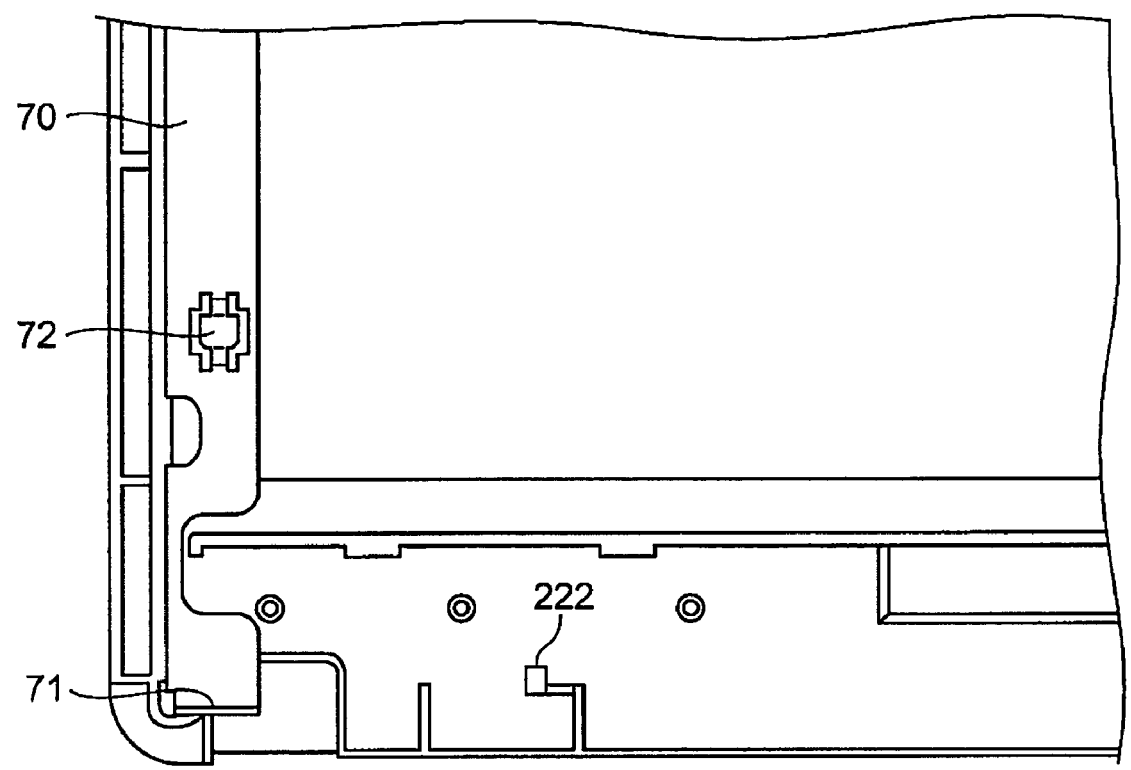
FIG. 16 is a plan view illustrating a bottom edge part of one of fixing brackets.

FIG. 15 is a perspective view illustrating a part of one of the fixing brackets, and FIG. 16 is a plan view illustrating a bottom edge part of one of the fixing brackets.

As also illustrated in FIGS. 15 and 16, the fixing bracket 70 is provided with locking projections 72 each projecting to the side of supporting the supporting board 60 and each having a shape in which a center part thereof is wider.

The locking projections 72 are for locking the supporting board 60 releasably by sliding it relative to the supporting board 60.

Figure 17:
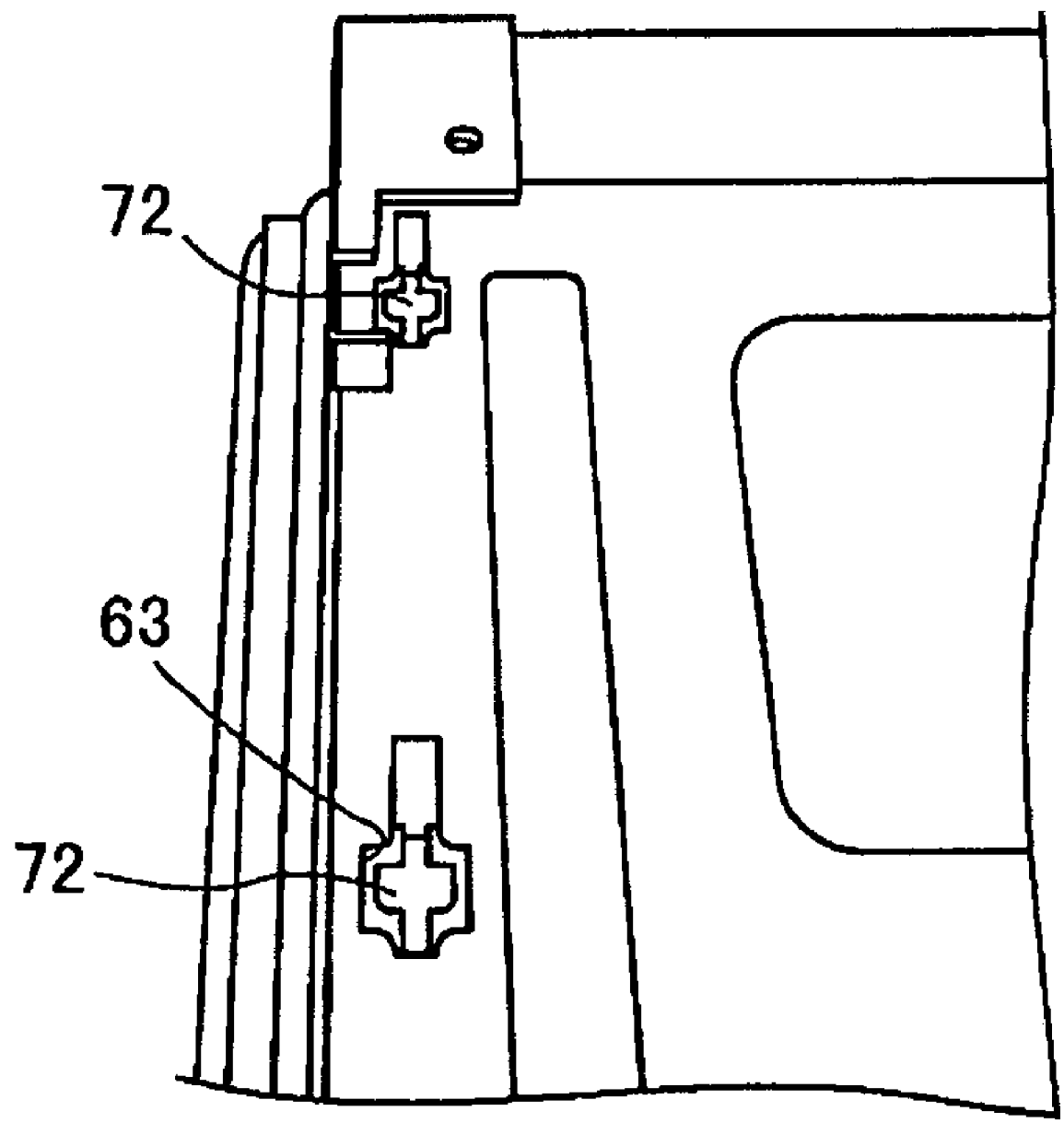
FIG. 17 is a view illustrating a part of a locking part when the supporting board is on the fixing bracket.
Figure 18:
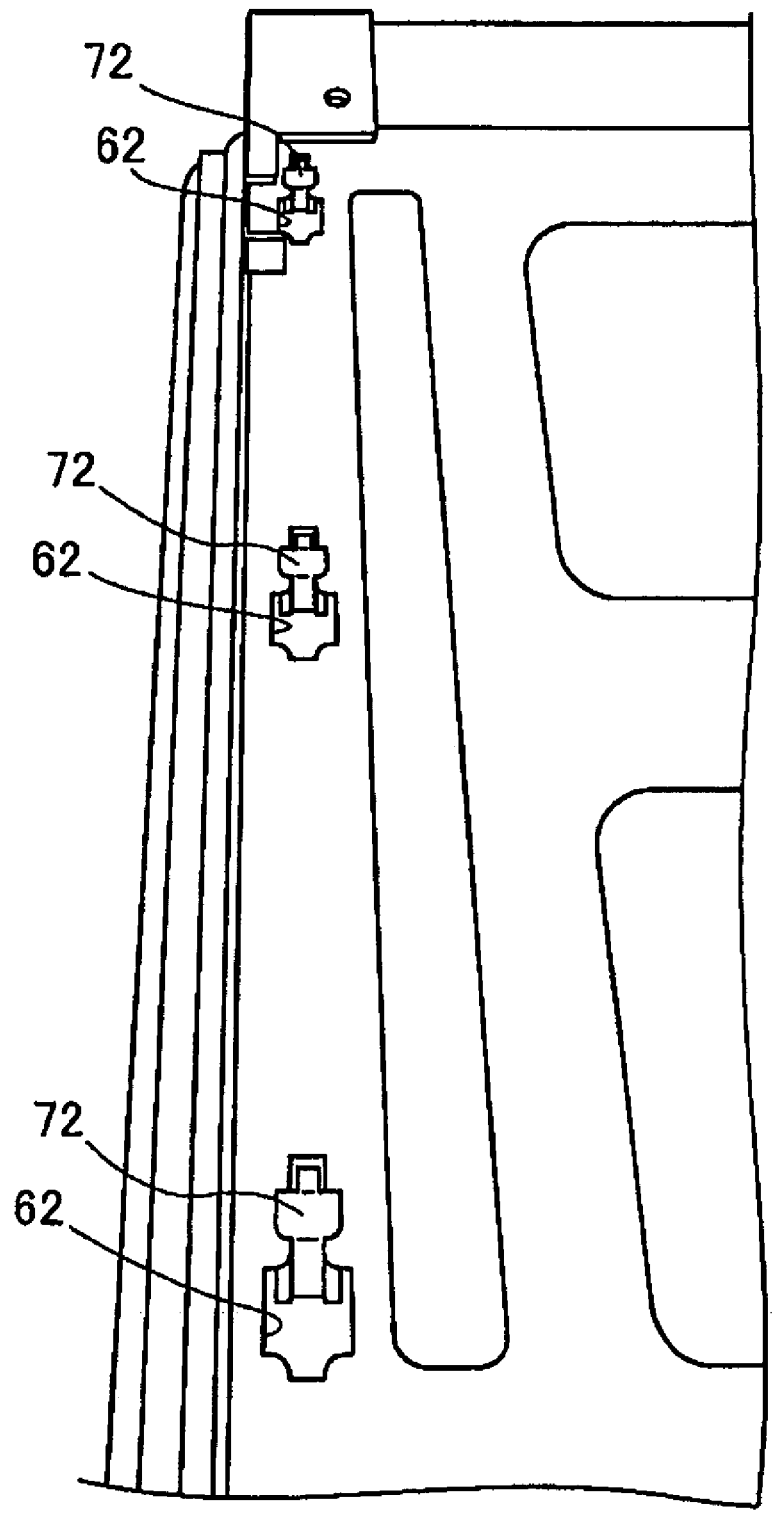
FIG. 18 is a view illustrating a state in which the supporting board has been slid downwardly from being in the state illustrated in FIG. 17.

FIG. 17 is a view illustrating a part of the locking part when the supporting board is on the fixing bracket, and FIG. 18 is a view illustrating a state in which the supporting board has been slid downwardly from being in the state illustrated in FIG. 17.

At a part, on the both sides of the supporting board 60, corresponding to each locking projection 72 formed on the fixing bracket 70, a locking hole 63 is formed which has a wide lower side thereof and a narrow upper side thereof. When the supporting board 60 is to be placed on the fixing bracket 70, the placement is carried out so that the wide part of each locking hole 63 may correspond to the corresponding locking projection 72 of the fixing bracket 70. By doing so, the locking projection 72 goes through the locking hole 63 and projects above a surface opposite to the supporting board 60 (the surface of the supporting board 60 on the side having the main substrate 30 and the like mounted thereon). In such a state, when the supporting board 60 is slid downwardly relative to the fixing bracket 70, the locking projection 72 of the fixing bracket 70 overlaps with the narrow part of the locking hole 63 of the supporting board 60, as illustrated in FIG. 18. Accordingly, the supporting board 60 is locked by the fixing bracket 70. Therefore, a state in which the supporting board 60 is not detached from the fixing bracket 70 even if lifted is achieved.

Figure 19:
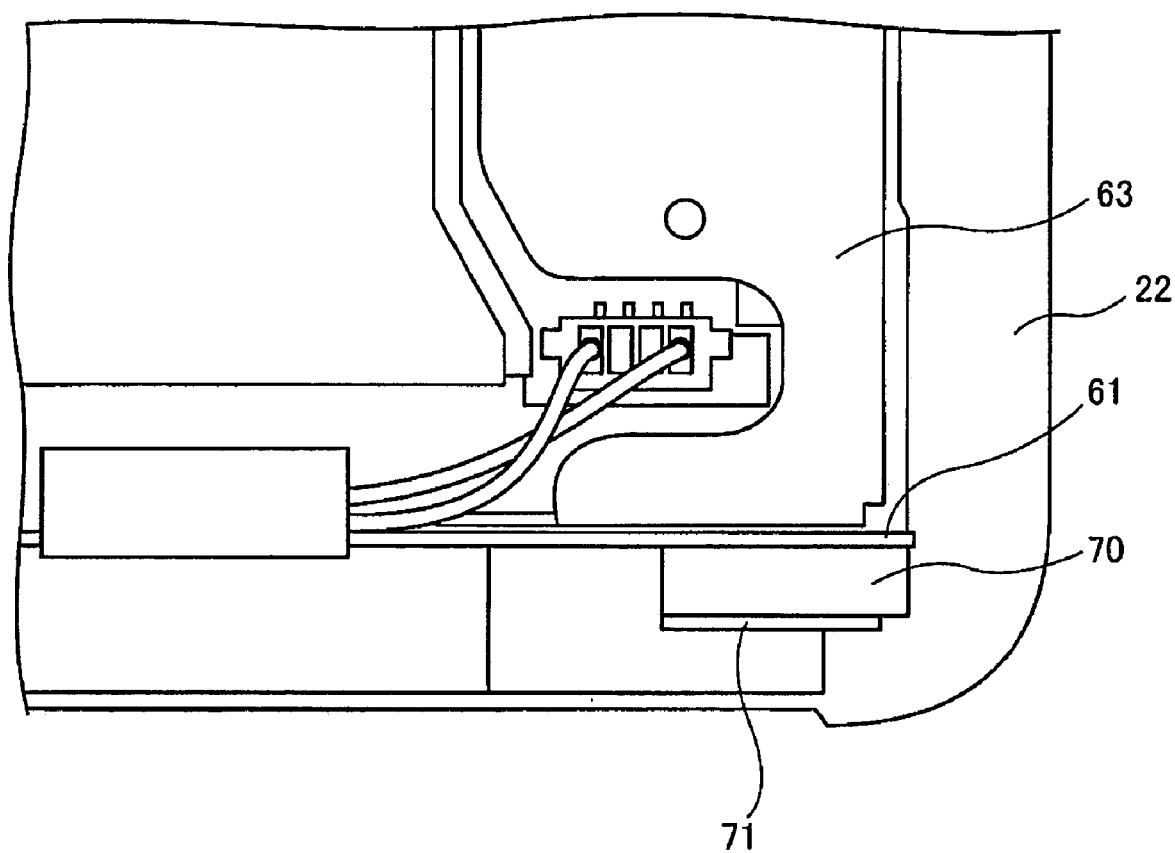
FIG. 19 is a view illustrating a state in which the supporting board is placed on the fixing bracket.
Figure 20:
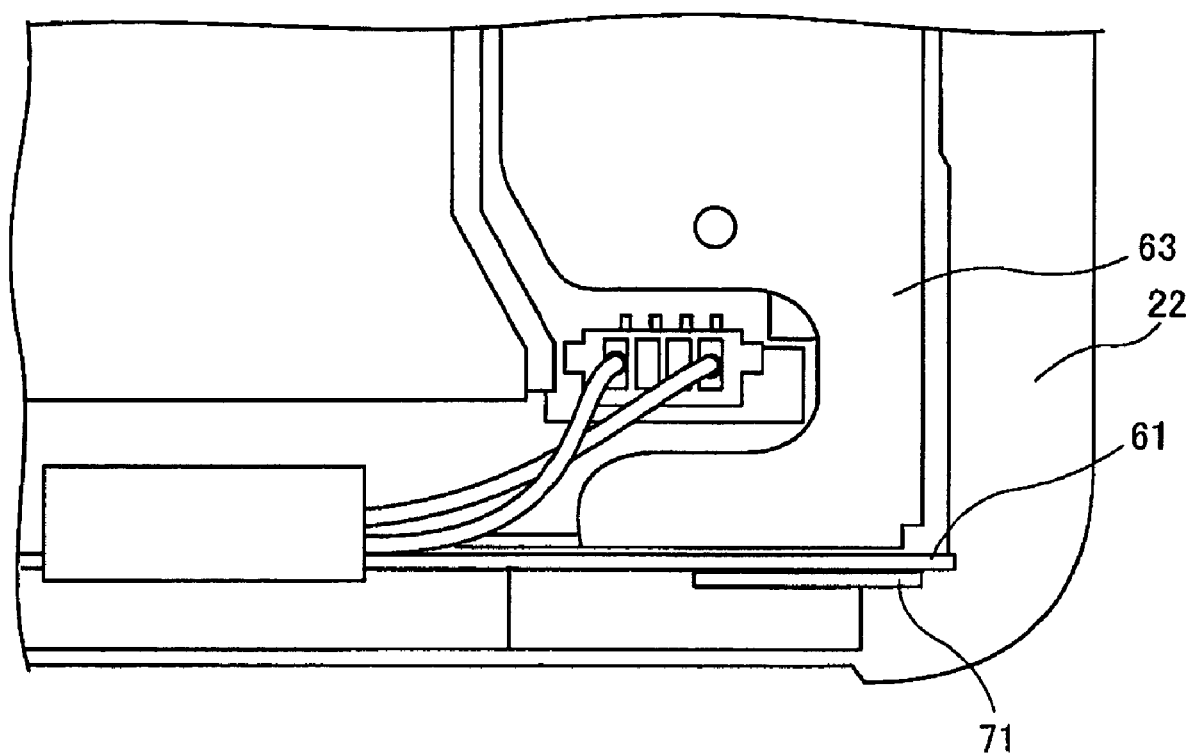
FIG. 20 is a view illustrating a state in which the supporting board has been slid downwardly relative to the fixing bracket.

FIGS. 19 and 20 are views illustrating a positional relationship between the fastening part of the fixing bracket and the supporting board lower surface. FIG. 19 is a view illustrating a state in which the supporting board is placed on the fixing bracket, and FIG. 20 is a view illustrating a state in which the supporting board has been slid downwardly relative to the fixing bracket.

The supporting board lower surface 61 before the slide is apart from the fastening part 71 of the fixing bracket 70, as illustrated in FIG. 19. When the supporting board 60 is slid downwardly, the supporting board 60 is locked by the fixing bracket 70 as illustrated in FIG. 18, while the supporting board lower surface 61 runs into the fastening part 71 of the fixing bracket 70 as illustrated in FIG. 20.

Meanwhile, due to the slide, the locking projection 222 formed on the front frame 22 goes into the front frame engaging hole 611 (refer to FIG. 14) provided in the supporting board lower surface 61.

In this state, the mounting hole 711 of the fastening part 71 and the mounting hole 612 of the supporting board lower surface 61, which are illustrated in FIG. 14, overlap with each other, and, furthermore, the screw hole (not illustrated in the drawing) provided in the mounting bracket 63 also comes to overlap with them. By use of these holes, as illustrated in FIG. 12, screw fixation is achieved by the screw 718 on both sides.

As described above, in the PC main unit of this embodiment, when, by use of the pair of fixing brackets 70 extending along both edge of the display panel 21, the supporting board 60 having multiple electronic parts mounted thereon is placed onto the fixing bracket 70 and thereby being arranged at the back of the display panel 21 and being slid, the supporting board 60 is locked by the fixing bracket 70. In the case of the PC main unit of this embodiment, it has such a simple structure; therefore, it can be easily assembled or dissembled.

[Antenna Mounting Structure]

Figure 21:
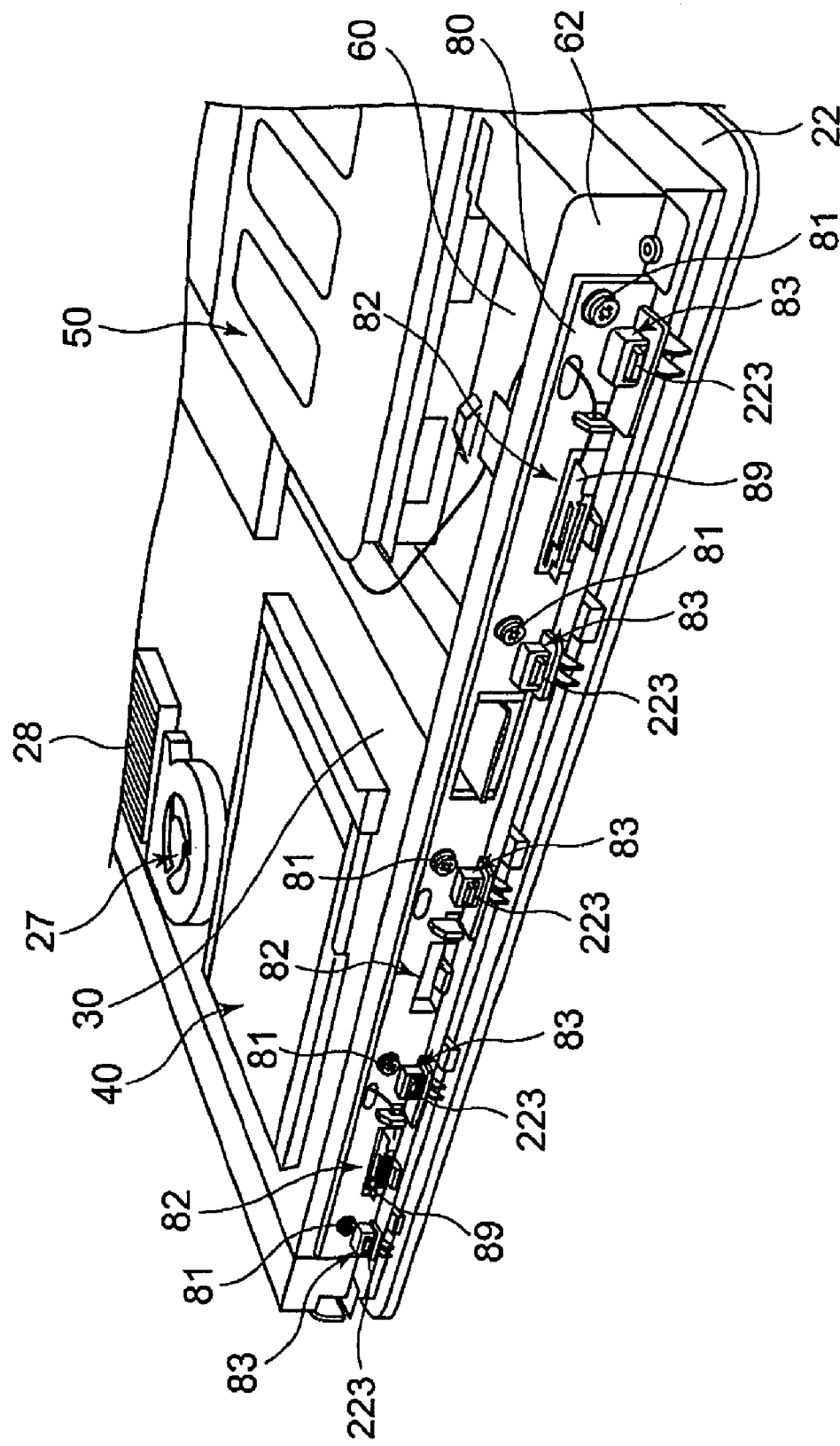
FIG. 21 is a perspective view of a rear surface of the PC main unit seen from obliquely above with the rear surface cover having been detached.
Figure 22:
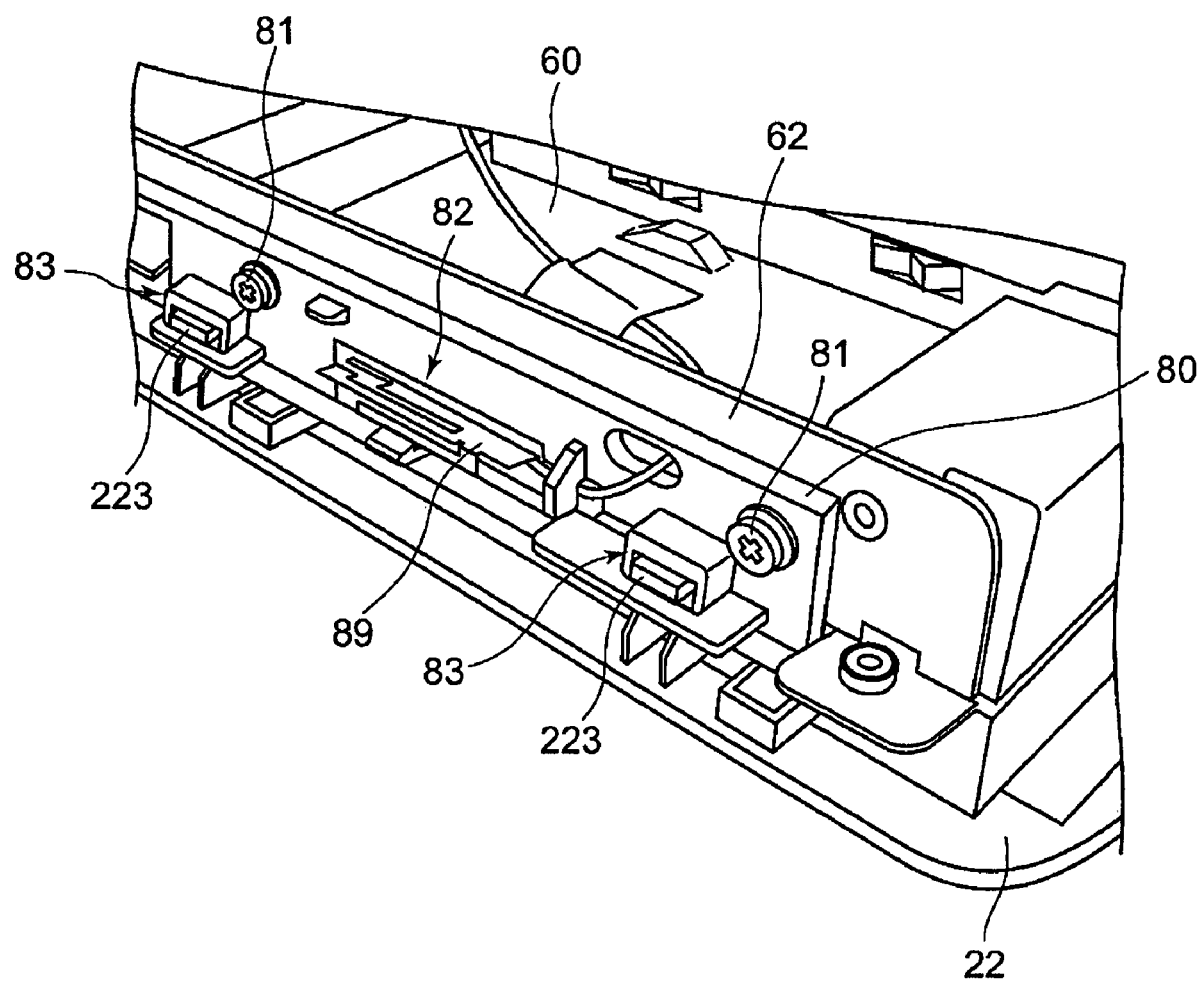
FIG. 22 is a partial enlarged view of FIG. 21.

FIG. 21 is a perspective view of a rear surface of the PC main unit seen from obliquely above with the rear surface cover having been detached, and FIG. 22 is a partial enlarged view of FIG. 21.

In FIG. 21, the main substrate 30, the HDD unit 40, the fan 27, the radiating fin 28, the optical disk unit 50, the supporting board 60, and the like are illustrated as well.

On the supporting board upper surface 62 (also refer to FIG. 13), a frame 80 made of resin extending laterally along the supporting board upper surface 62 is fixed by screws 81, and an antenna arrangement part 82 is formed at three sites, in the longitudinal direction (horizontal direction), of the frame 80. An antenna 89 is arranged at two of the three antenna arrangement parts 82. The other antenna arrangement part 82 is a backup antenna arrangement part. This part has no antenna arranged thereat, and is left empty.

Here, on the frame 80, engaging holes 83 are formed, and, on the front frame 22, locking claws 223 that respectively go into the engaging holes 83 and fix the front frame 22 to the frame 80 are formed. When the supporting board 60 is placed on the fixing bracket 70 and slid downwardly as described above, the locking claw 223 goes into the engaging hole 83, and then the front frame 22 is fixed to the frame 80. Accordingly, the antenna 89 is fixed to the antenna arrangement part 82. The detail will be described below.

Figure 23:
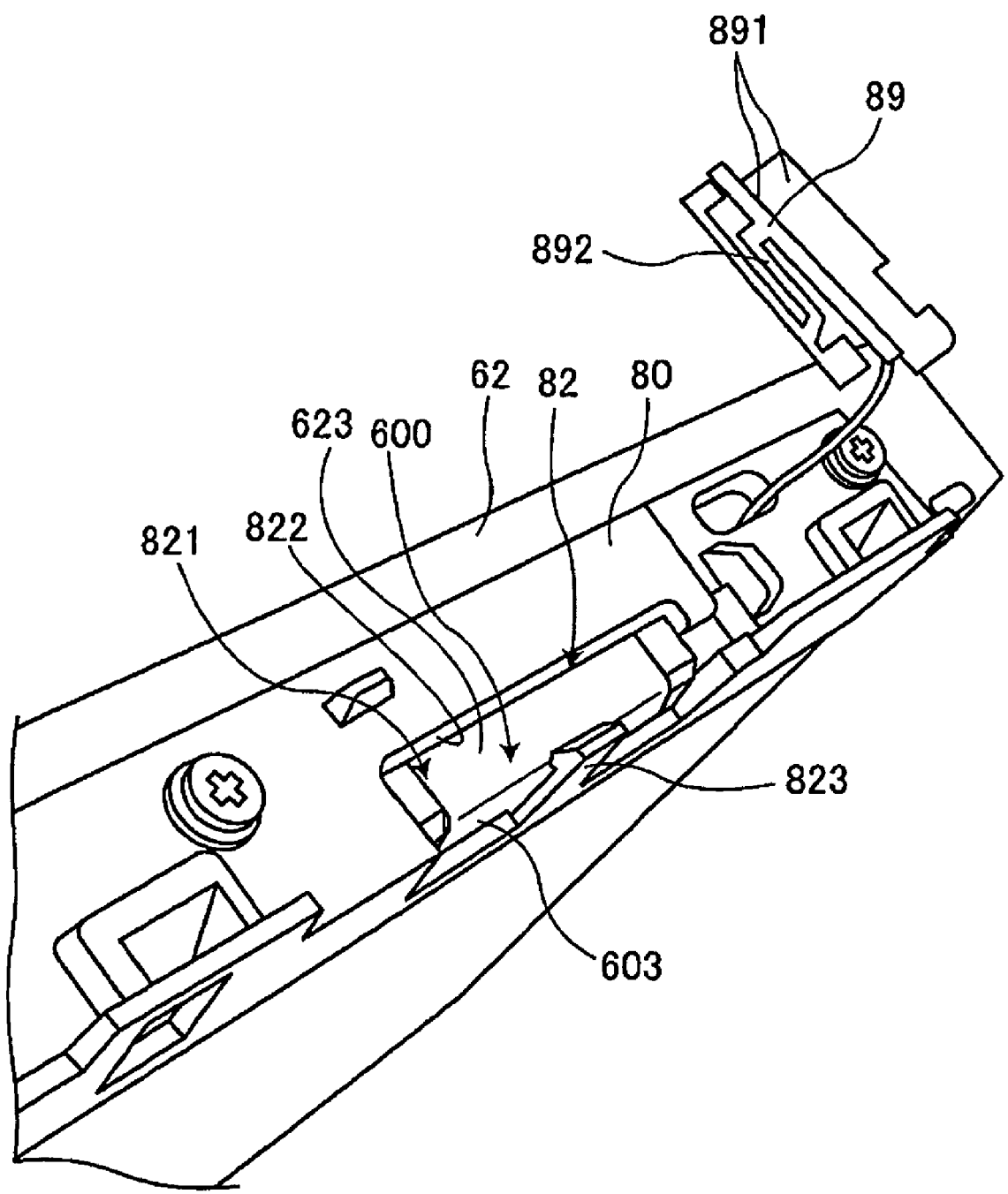
FIG. 23 is a perspective view illustrating one of three antenna arrangement parts.

FIG. 23 is a perspective view illustrating one of the three antenna arrangement parts. Here, illustrated is a state in which the front frame is detached and an antenna is detached from the antenna arrangement part.

The frame 80 has, at the antenna arrangement part 82, an opening 821 that allows a part of the upper edge of the front surface (the surface facing the rear surface 21b (refer to FIGS. 14 and 15) of the display panel 21) of the supporting board 60 to be exposed. At the opening 821, an exposed part 603 composed of a part of the supporting board front surface, and an antenna grounding surface 600 which is continuous with the exposed part 603 and formed by an exposed part 623 composed of a part of the supporting board upper surface 62, are exposed.

The antenna 89, which is a general-purpose product and has a base part 891 to be grounded and a transmitting and receiving part 892 that transmits and receives a radio wave, is arranged at the antenna arrangement part 82 in a position in which the base part 891 of the antenna 89 comes in contact with the antenna grounding surface 600. Meanwhile, at the antenna arrangement part 82, a contact wall 822 is formed with which the transmitting and receiving part 892 of the antenna 89 comes in contact when the antenna 89 is arranged at the antenna arrangement part 82. The contact wall 822 is a wall, at the opening 821, which blocks out the exposed part 623 on the supporting board upper surface 62, and is formed, on the frame 80, upright vertically from the supporting board upper surface 62.

To be more specific, the base part 891 of the antenna 89 has a bent shape which comes in contact with both the exposed part 603 in the front surface of the supporting board 60 and the exposed part 623 of the supporting board upper surface 62, while having a shape further bent and upright from the base part 891 so that the transmitting and receiving part 892 of the antenna 89 can be attached to the contact wall 822.

Meanwhile, the antenna arrangement part 82 has a projecting piece 823 which holds the base part 891 of the antenna 89 such that the base part 891 is interposed between the projecting piece 823 and the antenna grounding surface 600 of the supporting board 60.

Figure 24:
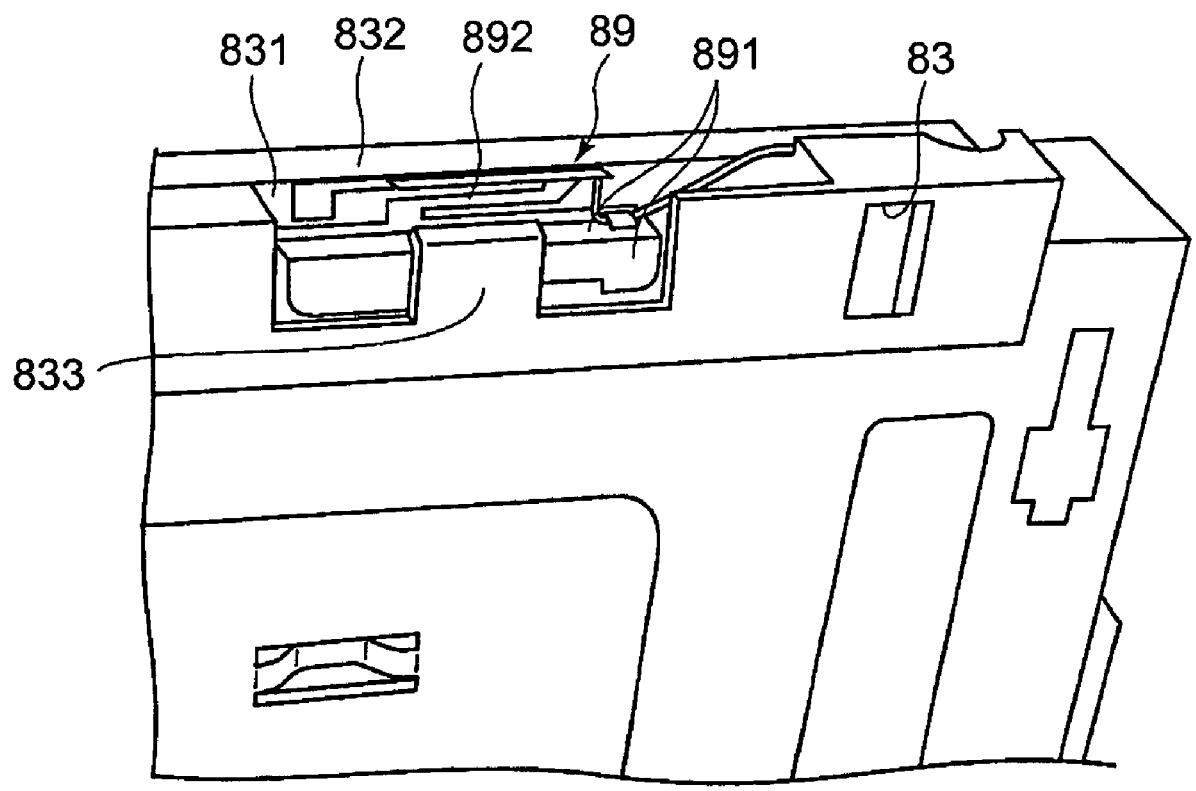
FIG. 24 is a perspective view illustrating a state in which an antenna is arranged at the antenna arrangement part.

FIG. 24 is a perspective view illustrating a state in which an antenna is arranged at an antenna arrangement part.

The antenna 89 is arranged so that the base part 891 can come in contact with the antenna grounding surface 600 (refer to FIG. 23) while being pressed by the projecting piece 823.

Figure 25:
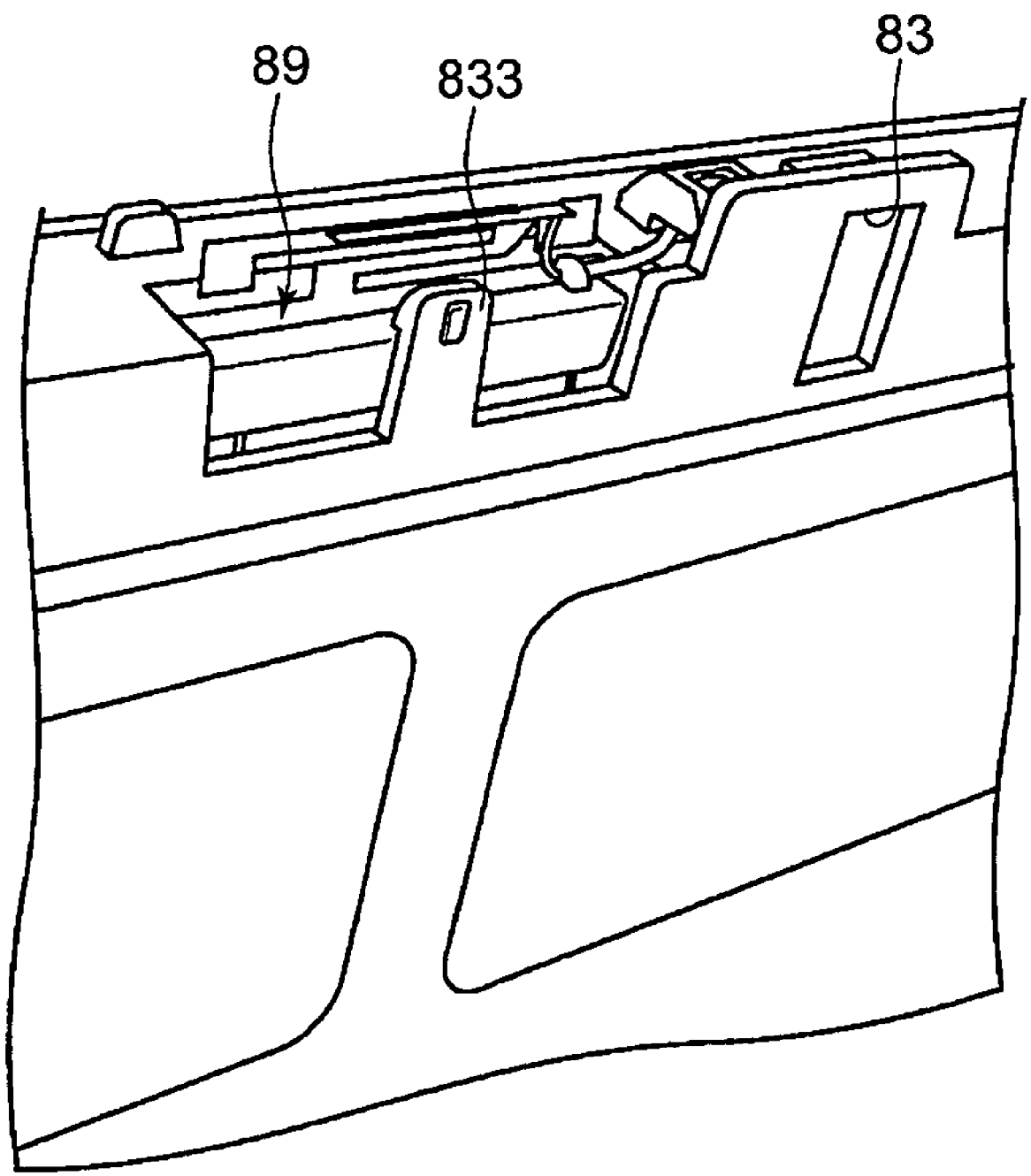
FIG. 25 is a perspective view illustrating another site of antenna arrangement part in which an antenna is arranged.

FIG. 25 is a perspective view illustrating another site of antenna arrangement part in which an antenna is arranged.

Although there are some parts slightly different from the antenna arrangement part illustrated in FIG. 24 regarding the shape of the projecting piece 823 and the like, the basic composition is the same as the antenna arrangement part illustrated in FIG. 24.

Figure 26:
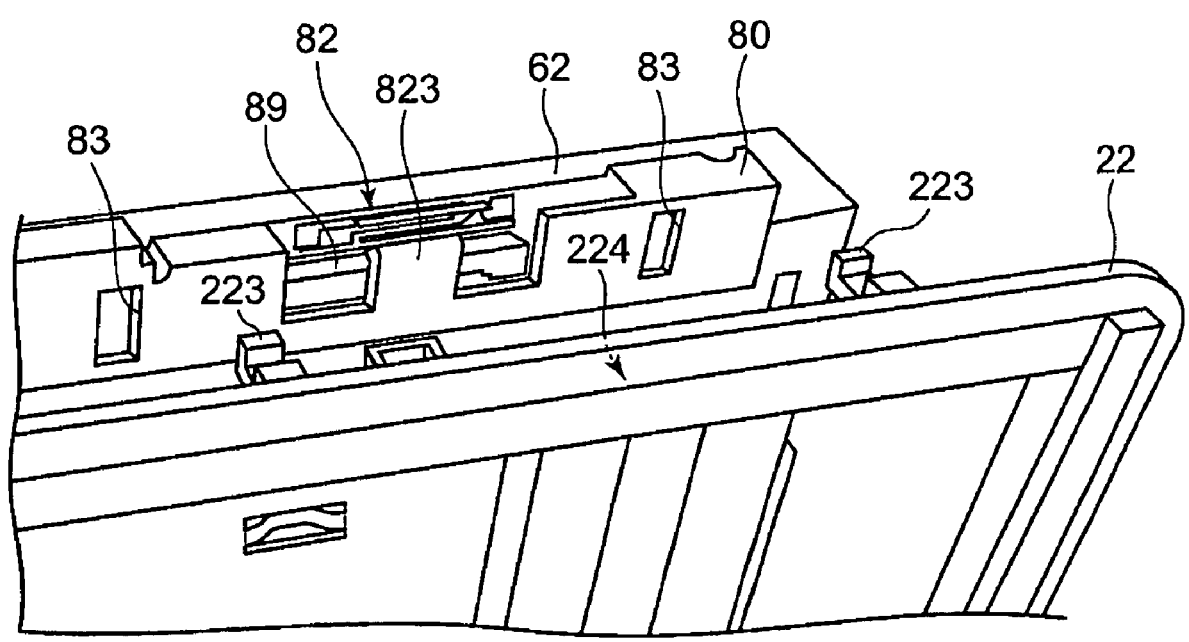
FIG. 26 is a view illustrating the antenna arrangement part in which an antenna is arranged and the front frame.
Figure 27:
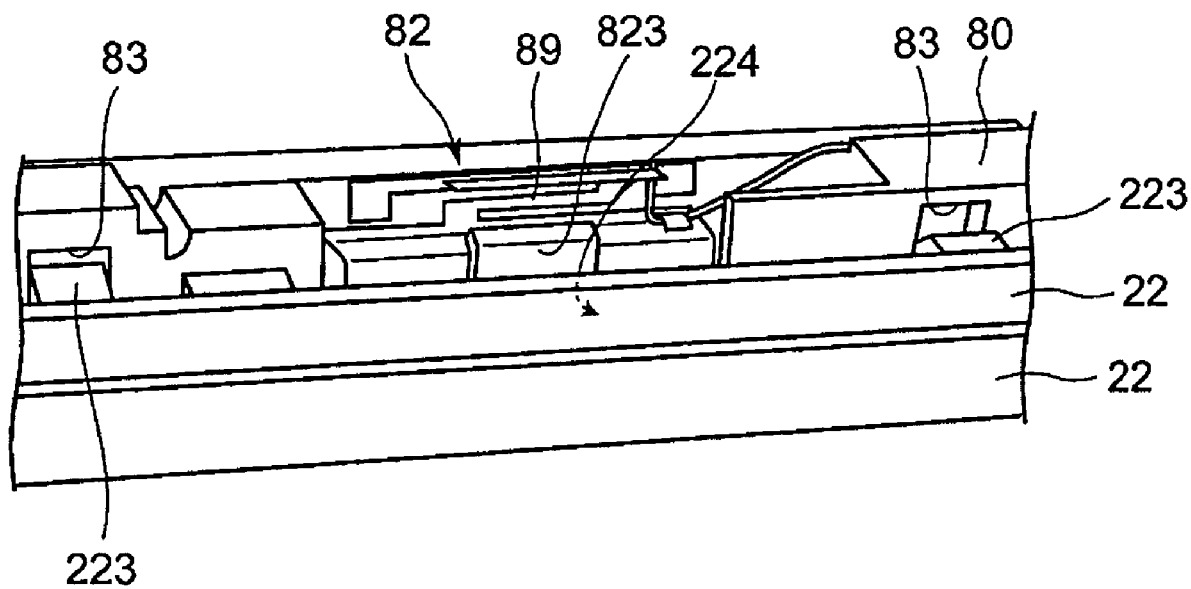
FIG. 27 is a view illustrating he antenna arrangement part in which an antenna is arranged and the front frame.

FIGS. 26 and 27 are views illustrating the antenna arrangement part in which an antenna is arranged and the front frame. FIG. 26 illustrates a state before the front frame 22 is attached, and the FIG. 27 illustrates a state after the front frame 22 has been attached. On both sides of the antenna arrangement part 82, the engaging hole 83 is formed. The locking claw 223 of the front frame 22 goes into the engaging hole 83, and then the front frame 22 is fixed to the frame 80.

At this time, the projecting piece 823 of the antenna arrangement part 82 is pressed by a pressing part 224 which is a part, on the front frame 22, facing the projecting piece 823. Thereby, the projecting piece 823 presses the base part 891 of the antenna 89 to the antenna grounding surface 600 of the supporting board 60. Therefore, the base part 891 of the antenna 89 is surely brought in contact with the antenna grounding surface 600, and maintained at a ground potential.

As described above, according to this embodiment, the antenna 89 is temporarily locked by the projecting piece 823 by arranging the antenna 89 at the antenna arrangement part 82, and the antenna 89 can be surely pressed to the antenna grounding surface 600 of the supporting board 60 through the projecting piece 823 by the attachment of the front frame 22. According to this embodiment, with such a simple structure, the antenna 89, which is a general-purpose product, can be easily assembled and detached, and antenna performance can be maintained by reliable contact between the supporting board 60 and the base part 891 after the assembly.

[Attachment and Removal Structure Between the Main Substrate and the Optical Disk Unit]

Figure 28:
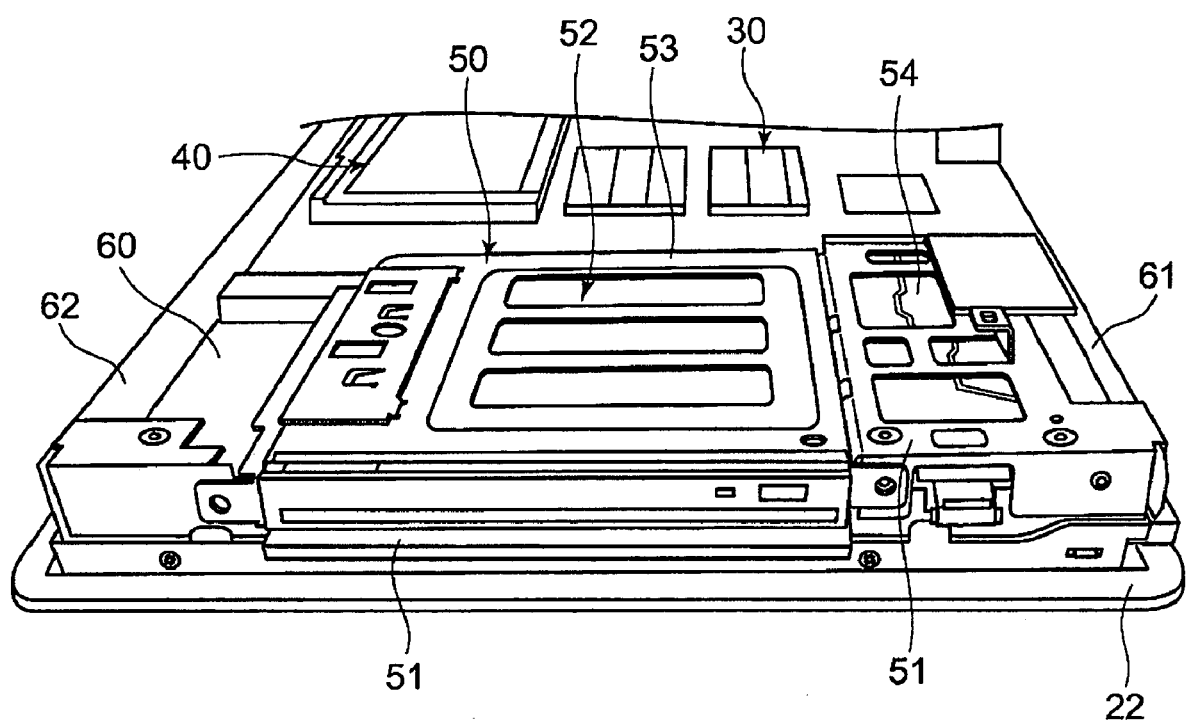
FIG. 28 is a perspective view illustrating a rear surface of the PC main unit viewed from an optical disk unit side at an oblique angle when a rear surface cover has been detached from the PC main unit.

FIG. 28 is a perspective view illustrating a rear surface of the PC main unit from an optical disk unit side at an oblique angle when a rear surface cover is detached from the PC main unit.

The optical disk unit 50 includes: a base board 51; an optical disk drive 52 which is a plate-like shape electronic part; a holder 53 that holds the optical disk drive 52; and a circuit substrate 54. The optical disk drive 52 is an electronic part which is removably loaded with an optical disk, such as a CD and a DVD, and accesses the loaded optical disk. The optical disk drive 52 is supported by the base board 51 in a state of being held by the holder 53, while the circuit substrate 54 is fixed on the base board 51. Here, according to FIG. 28, in a region in which the optical disk drive 52 is supported, the base board 51 extends below the optical disk drive 52, goes through between the optical disk drive 52 and the circuit substrate 54, and then rises up, while, in a region in which the circuit substrate 54 is fixed, the base board 51 extends above the circuit substrate 54.

Meanwhile, the entire optical disk unit 50 is mounted on the supporting board 60.

In FIG. 28, the main substrate 30 extending at the back of the optical disk unit 50 and the HDD unit 40 arranged on the main substrate 30 are also illustrated.

Figure 29:
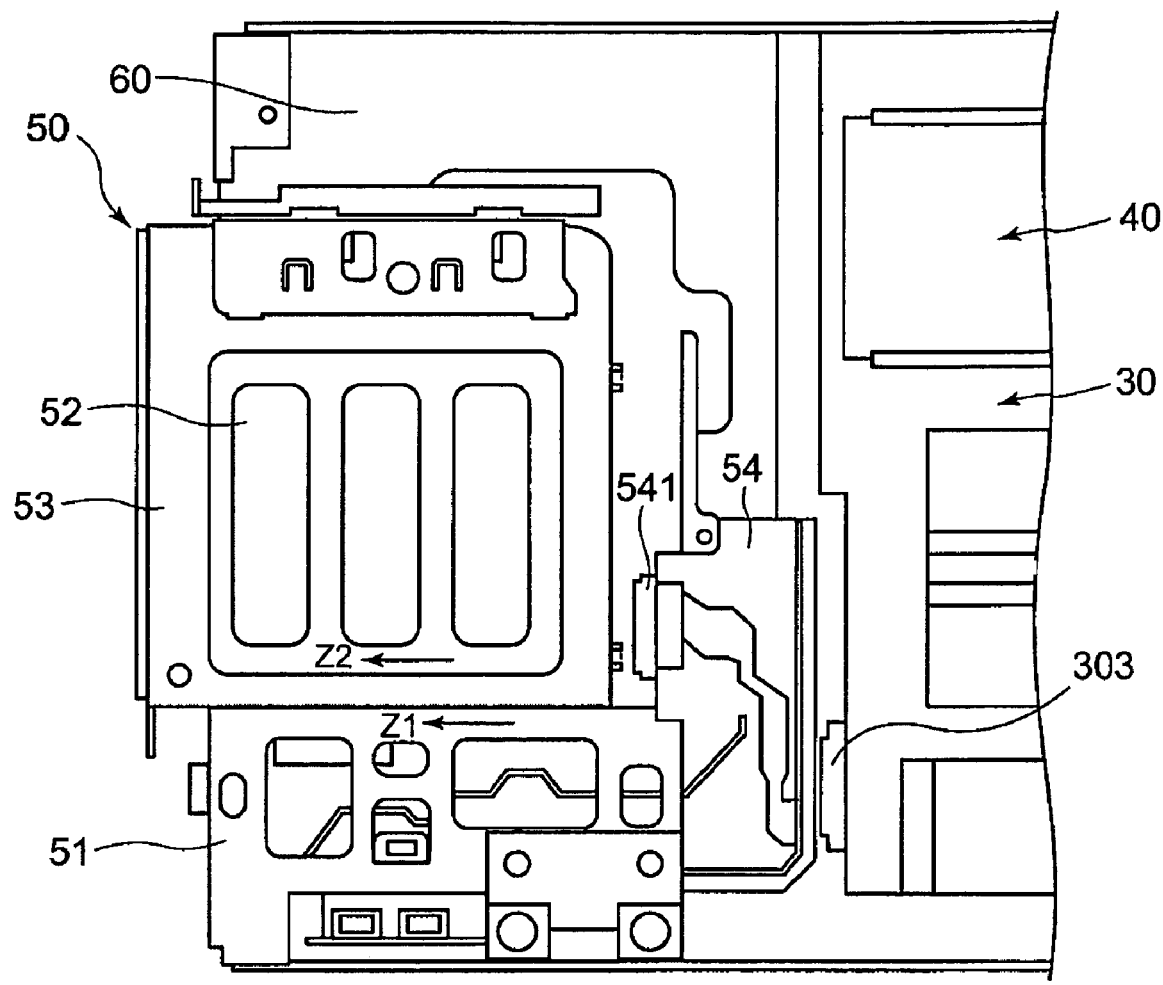
FIG. 29 is a view illustrating a state in which an optical disk unit has been slid slightly.

FIG. 29 is a view illustrating a state in which the optical disk unit 50 has been slid slightly.

The optical disk unit 50 is configured to slide relative to the supporting board 60 (the detail will be described below). Here, a state is illustrated in which the entire optical disk unit 50 is slid in the direction of an arrow Z1 from the attached state illustrated in FIG. 4, and, furthermore, the holder 53 constituting the optical disk unit 50 is further slid relative to the base board 51 in a Z2 direction.

As described above, the optical disk unit 50 has a double sliding structure in which the entire optical disk unit 50 as an integrated module is slid relative to the supporting board 60, and, furthermore, the holder 53, which constitutes the optical disk unit 50 and holds the optical disk drive 52 is slid relative to the base board 51.

In FIG. 29, the connector 303 (also refer to FIG. 4) provided in the main substrate 30 appears due to the slide of the optical disk unit 50, and a connector 541 provided in the circuit substrate 54 appears due to the slide of the holder 53.

The connector 303 provided in the main substrate 30 is a connector to be linked with a connector 542 (refer to FIG. 31) provided on the rear surface of the circuit substrate 54 when looked from the direction as in FIG. 29. The connector 541, which is provided in the circuit substrate 54, appearing in FIG. 29 is a connector to be linked with a connector (not illustrated in the drawing) provided in the optical disk drive 52.

Figure 30:
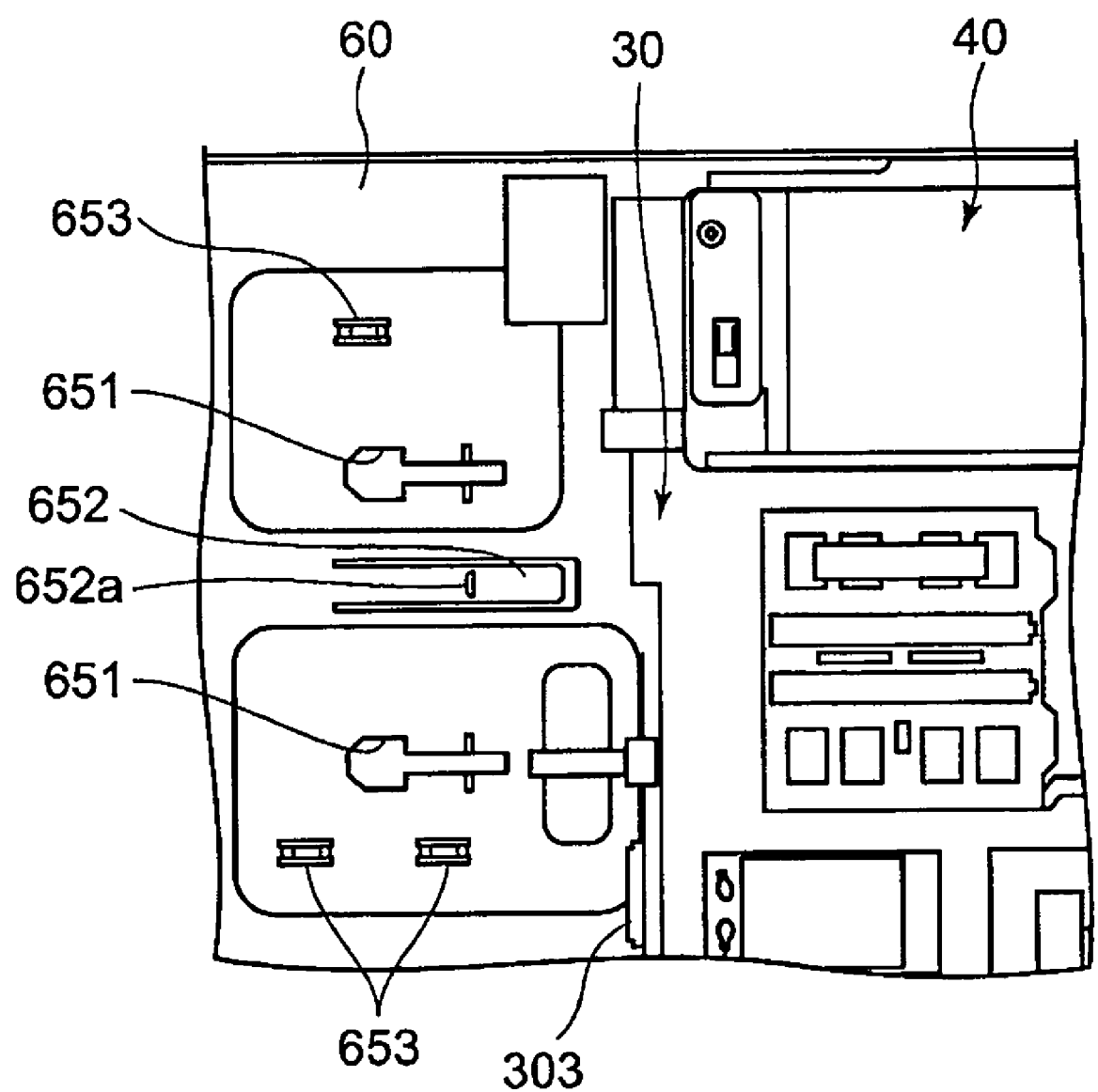
FIG. 30 is a view illustrating the supporting board after the optical disk unit has been detached therefrom.
Figure 31:
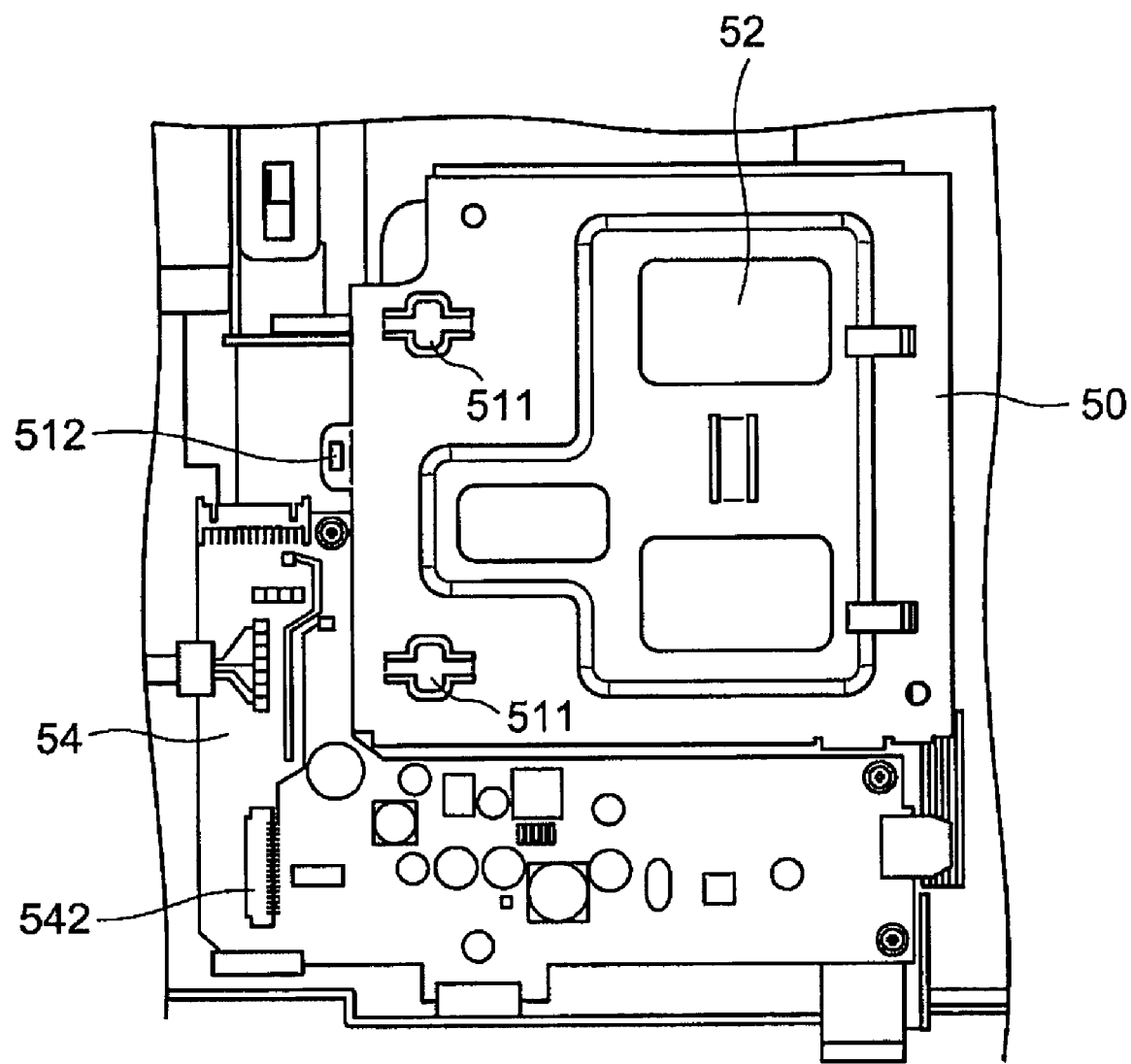
FIG. 31 is a view illustrating a surface of the optical disk unit on a side thereof coming in contact with the supporting board.

FIG. 30 is a view illustrating the supporting board after the optical disk unit has been detached, and FIG. 31 is a view illustrating a surface of the optical disk unit on a side thereof being in contact with the supporting board.

As illustrated in FIG. 30, the supporting board 60 is provided with: a locking hole 651 that locks the base board 51 of the optical disk unit 50; a locking piece 652 that prevents locking of the optical disk unit 50 which has been locked from being carelessly released; and a guiding projection 653 that guides sliding of the optical disk unit 50. The locking piece 652 has a cantilever shape, and is provided with, at a center thereof, a locking claw 652a.

Meanwhile, the base board 51 of the optical disk unit 50 is provided at a rear surface thereof, as illustrated in FIG. 31, with a locking projection 511 that goes into the locking hole 651 illustrated in FIG. 30 and a locking projection 512 that is locked by the locking claw 652a. When the optical disk unit 50 is to be installed to the supporting board 60, the optical disk unit 50 is placed on the supporting board 60 so as to align the locking projection 511 on the rear surface of the base board 61 with a wide width part of the locking hole 651 of the supporting board 60. At this time, the base board 51 comes in contact with the guiding projection 653, and sliding is guided by the guiding projection 653. When the optical disk unit 50 is slid on the supporting board 60 towards the side of the main substrate 30 in this state, the locking projection 511 on the rear surface of the base board 52 is shifted to a narrow width part of the engaging hole 651 of the supporting board 60, and then the base board 51 is fixed onto the supporting board 60. Meanwhile, at this time, the locking projection 512 for locking at the rear surface of the base board 51 goes over the locking claw 652a on the supporting board 60, and then sliding in the opposite direction is locked. Furthermore, at this time, the connector 542 mounted on the rear surface of the circuit substrate 54 constituting the optical disk unit 50 is linked with the connector 303 fixed onto the main substrate 30.

When the optical disk unit 50 is to be detached, a thin stick is inserted underneath the base board 51 so as to press the locking piece 652, the locking between the locking projection 512 for locking at the lower surface of the base board 51 and the locking claw 652a provided on the supporting board 60 is released, and then, directly, the optical disk unit 50 is slid in the direction going away from the main substrate 30. Then, the locking projection 511 on the rear surface of the base board 51 is shifted to the wide width part of the engaging hole 651 provided to the supporting board 60. When the optical disk unit 50 is lifted up in this state, the optical disk unit 50 can be detached from the supporting board 60.

As described above, the PC main unit of this embodiment includes: the main substrate 30 that is fixed onto the supporting board 60 extending on the rear surface of the display panel 21; and the optical disk unit 50 that is supported by the supporting board 60. When the optical disk unit 50 is slid relative to the supporting board 60, the optical disk unit 50 is locked by the supporting board 60, or, when it is slid in the opposite direction, the locking is released. When the optical disk unit 50 is locked by sliding, the connector 303 on the main substrate 30 and the connector 542 of the circuit substrate 54 constituting the optical disk unit 50 are linked with each other. Then, when the locking is released by sliding in the opposite direction, the link between the connectors 303 and 542 is also released. With such a structure, assembly and disassembly of the optical disk unit 50 to and from the supporting board 60 becomes easy, and, regarding the main substrate 30, its attachment to and detachment from the optical disk unit 50 become easy; therefore, its installment into and detachment from the supporting board 60 become easy.

Figure 32:
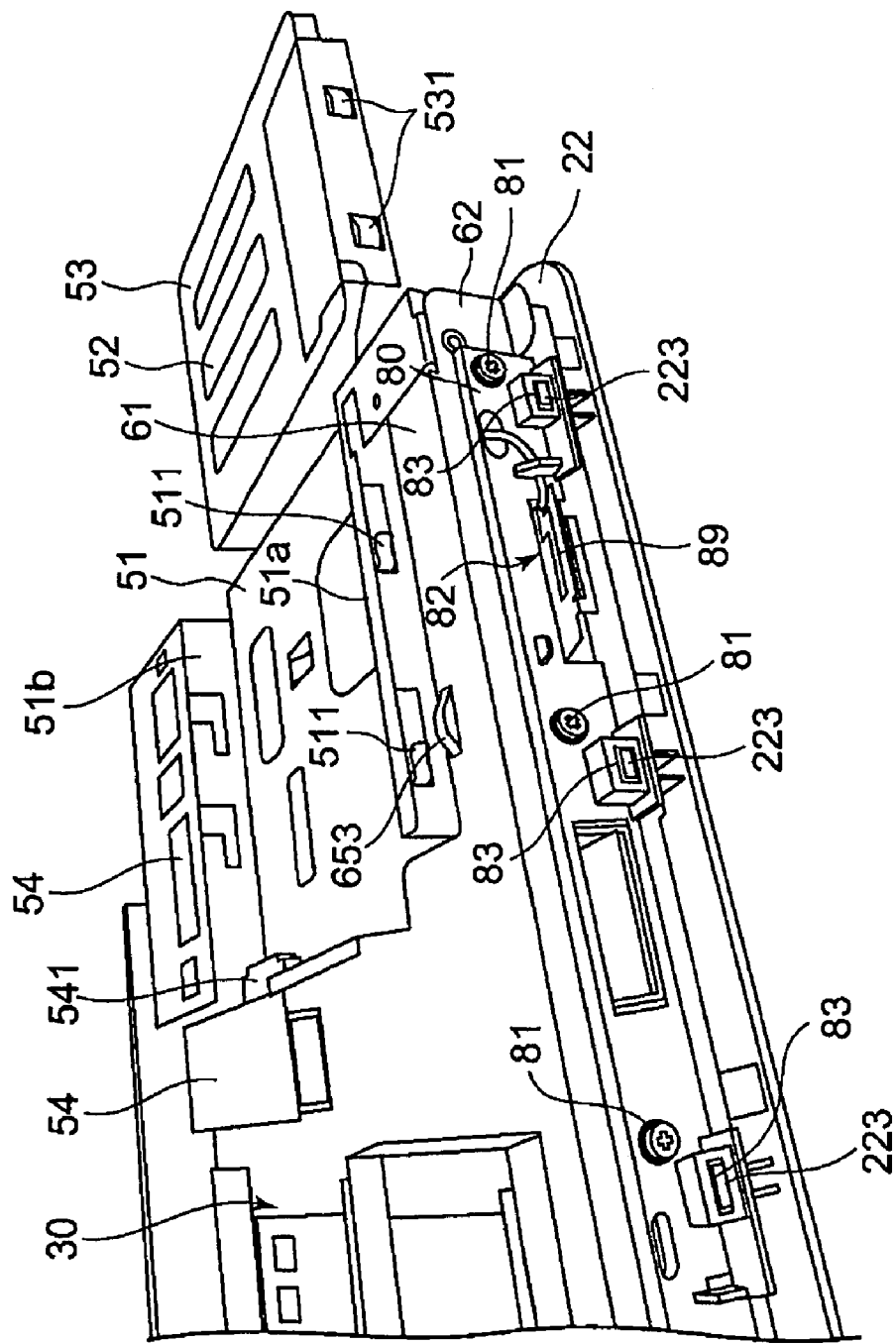
FIG. 32 is an exploded perspective view illustrating a state in which the holder has been detached while a base board of the optical disk unit is left on the supporting board.

FIG. 32 is an exploded perspective view illustrating a state in which the holder 53 has been detached while the base board 51 of the optical disk unit 50 is left on the supporting board 60.

On one side surface 51a of the base board 51, locking pieces 513 are provided. In the meantime, the holder 53 is provided with, on one side surface 53a, a locking bulging part 531 formed thereon.

The holder 53 is slid in directions coming close to and going away from the main substrate 30 by being guided by the side wall Sa and a wall surface 51b of the base board 51. When the holder 53 is slid in a direction coming close to the main substrate 30, the locking bulging part 531 on the side surface of the holder 53 comes to be locked with the locking piece 513 formed on the side surface 51a of the base board 50, and then the holder 53 is locked.

Meanwhile, by sliding towards the side of the main substrate 30, the connector 541 provided in the circuit substrate 54 and a connector, which is not illustrated in the drawing, provided in the optical disk drive 52 are linked with each other.

Figure 33:
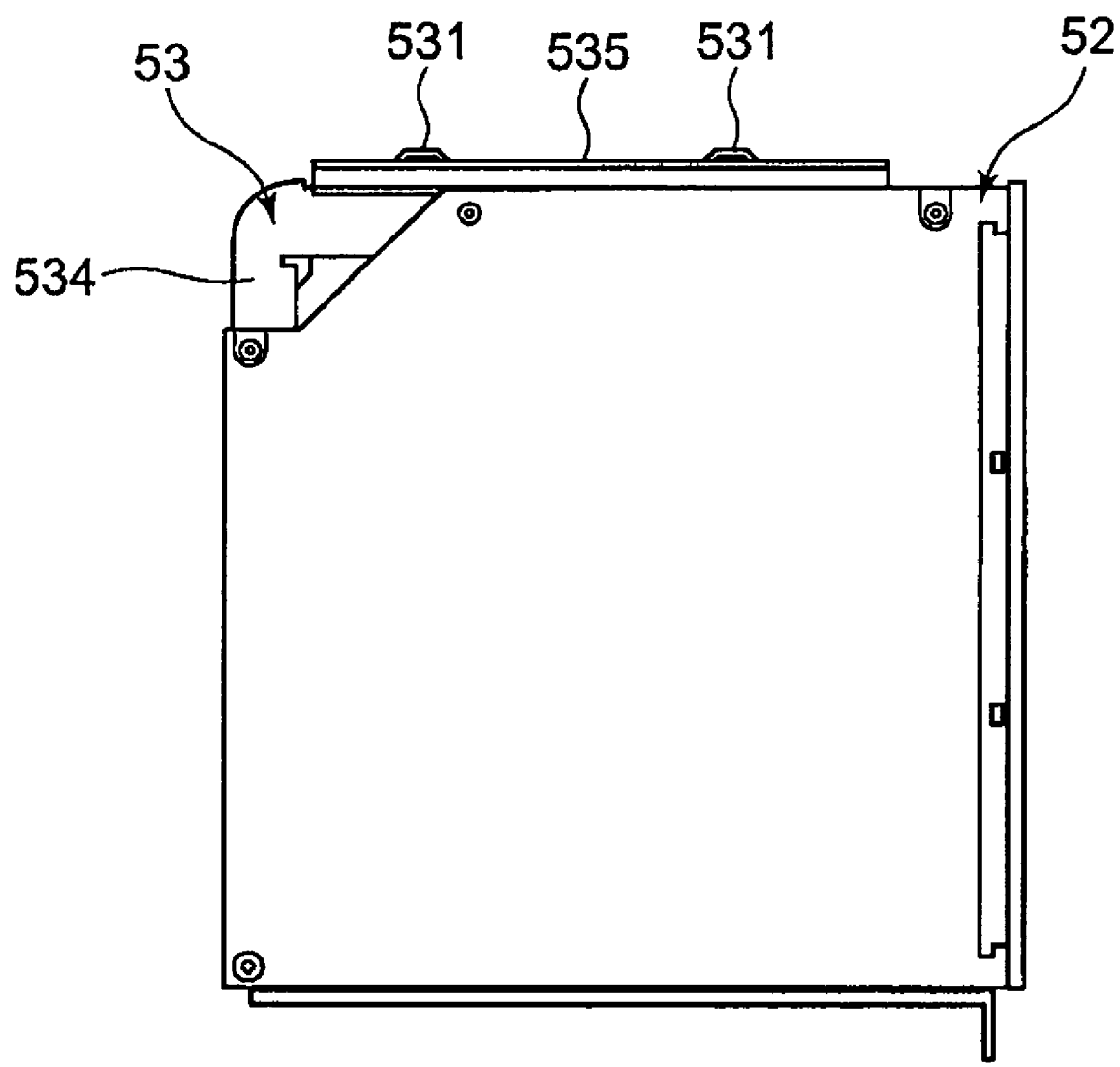
FIG. 33 is a view illustrating an optical disk drive in a state of being held by a holder.
Figure 34:
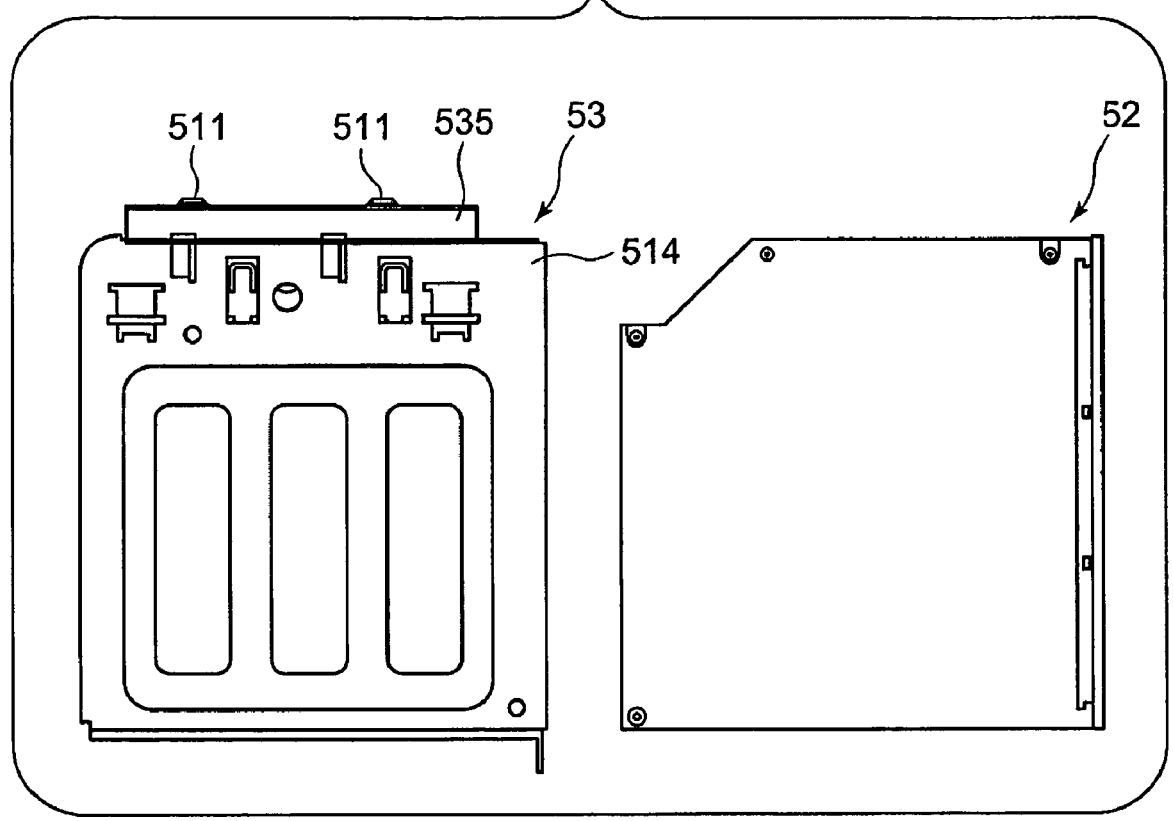
FIG. 34 is a view illustrating side-by-side the holder and the optical disk drive in a state of being detached from the holder.

FIG. 33 is a view illustrating the optical disk drive in a state of being held by the holder, and FIG. 34 is a view illustrating side-by-side the holder and the optical disk drive in a state of being detached from the holder.

The holder 53 includes: a main member 534 on which the optical disk drive 52 is placed; and a sliding board 535 that is slid relative to the main member 534 so as to press one side surface of the optical disk drive 52. As illustrated in FIG. 34, the optical disk drive 52 is placed on the holder 53 in a state where the sliding board 535 is opened, and the sliding board 535 is narrowed, as illustrated in FIG. 33, so that the optical disk drive 52 can be held by the holder 53.

The electronic apparatus of the present disclosure includes: a first circuit substrate that is fixed to a supporting board extending on a rear surface of a display panel; and a unit that is supported by the supporting board. When the unit is slid relative to the supporting board, the unit is locked by the supporting board. Then, when it is slid in the opposite direction, the locking is released. When the unit is locked by the sliding, a first connector of the circuit substrate and a second connector of the circuit substrate are linked with each other. When the locking is released by sliding in the opposite direction, the linkage between the connectors is also released. With this structure, the unit can be easily assembled and disassembled, and, regarding the first circuit substrate, its attachment to and detachment from the unit become easy; therefore, the installment and detachment become easy.

What is claimed is:

1. An electronic apparatus, comprising:
a display panel that has a display screen displaying an image on a front surface thereof;
a supporting board that has a first surface extending facing a rear surface of the display panel;
a first circuit substrate that is fixed to a second surface of the supporting board; and
a unit that includes a base board, a plate-like electronic part supported by the base board, and a second circuit substrate fixed to the base board, and that is supported on the second surface of the supporting board, wherein
the supporting board includes a first guiding locking part that guides sliding of the base board in directions coming close to and going away from the first circuit substrate, the first guiding locking part locking the base board when the base board is slid in the direction coming close to the first circuit substrate and releasing locking of the base board when the base board is slid in the direction going away from the first circuit substrate,
the base board includes a second guiding locking part that is in contact with the supporting board and that is slid in the directions coming close to and going away from the first circuit substrate by being guided by the first guiding locking part, the second guiding locking part being locked by the first guiding locking part when the base board is slid in the direction coming close to the first circuit substrate, and being released from locking to the first guiding locking part when the base board is slid in the direction going away from the first circuit substrate, and
the first circuit substrate and the second circuit substrate include a first connector and a second connector, respectively, the first connector and the second connector linking with each other when the base board is slid so that the second guiding locking part is guided to be locked by the first guiding locking part, and going away from each other when the base board is slid so that the second guiding locking part is released from locking to the first guiding locking part.

2. The electronic apparatus according to claim 1, wherein
the unit further includes a holder that holds the electronic part and is supported by the base board,
the base board includes a third guiding locking part that guides sliding of the holder in the directions coming close to and going away from the first circuit substrate, the third guiding locking part locking the holder when the holder is slid in the direction coming close to the first circuit substrate and releasing locking of the holder when the holder is slid in the direction going away from the first circuit substrate,
the holder includes a fourth guiding locking part that is in contact with the base board and that is slid in the directions coming close to and going away from the first circuit substrate by being guided by the third guiding locking part, the fourth guiding locking part being locked by the third guiding locking part when the holder is slid in the direction coming close to the first circuit substrate, and being released from locking to the third guiding locking part when the holder is slid in the direction going away from the first circuit substrate, at least a part of the second circuit substrate extends between the holder and the first circuit substrate, and the second circuit substrate and the electronic part include a third connector and a fourth connector, respectively, the third connector and the fourth connector linking with each other when the holder is slid so that the fourth guiding locking part is guided to be locked by the third guiding locking part, and going away from each other when the holder is slid so that the fourth guiding locking part is released from locking to the third guiding locking part.

3. The electronic apparatus according to claim 1, wherein the electronic part is an optical disk drive that is removably loaded with an optical disk and accesses the loaded optical disk.

4. The electronic apparatus according to claim 2, wherein the electronic part is an optical disk drive that is removably loaded with an optical disk and accesses the loaded optical disk.

5. The electronic apparatus according to claim 1, wherein the first circuit substrate is a main substrate provided with a CPU that executes a program.

6. The electronic apparatus according to claim 2, wherein the first circuit substrate is a main substrate provided with a CPU that executes a program.

7. The electronic apparatus according to claim 3, wherein the first circuit substrate is a main substrate provided with a CPU that executes a program.

* * * * *